(12) United States Patent
Itakura

(10) Patent No.: US 11,049,256 B2
(45) Date of Patent: Jun. 29, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kina Itakura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 306 days.

(21) Appl. No.: 16/229,692

(22) Filed: Dec. 21, 2018

(65) Prior Publication Data
US 2019/0197695 A1    Jun. 27, 2019

(30) Foreign Application Priority Data
Dec. 27, 2017 (JP) .............................. JP2017-251718

(51) Int. Cl.
*G06K 9/00* (2006.01)
*G06T 7/194* (2017.01)
(Continued)

(52) U.S. Cl.
CPC .......... *G06T 7/194* (2017.01); *G06K 9/00624* (2013.01); *G06K 9/3233* (2013.01);
(Continued)

(58) Field of Classification Search
CPC ............. G06K 9/00624; G06K 9/3233; G06K 9/4609; G06K 9/00771; G06T 5/50; G06T 7/194; G06T 2207/10016; G06T 2207/10024; G06T 2207/20076; G06T 2207/30196; G06T 2207/30221; G06T 7/143; H04N 13/111; H04N 5/232
See application file for complete search history.

(56) References Cited

U.S. PATENT DOCUMENTS 5,687,249 A * 11/1997 Kato ..................... G08G 1/017
340/936
2005/0129310 A1 * 6/2005 Herley ................... G06T 7/194
382/168
(Continued)

FOREIGN PATENT DOCUMENTS

JP        2005078195 A      3/2005

*Primary Examiner* — Tom Y Lu
(74) *Attorney, Agent, or Firm* — Rossi, Kimms & McDowell LLP

(57) ABSTRACT

An image processing apparatus including: one or more hardware processors; and a memory for storing instructions to be executed by the hardware processors, wherein when the instructions stored in the memory are executed by the hardware processors, the apparatus functions as: an acquiring unit configured to acquire image data; a derivation unit configured to derive an occurrence rate of a value corresponding to pixel data on a first region in each of a plurality of images corresponding to the image data acquired by the acquiring unit; and a determining unit configured to determine a value of the first region in a background image corresponding to the image data based on a plurality of values including a value on which a highest occurrence rate is derived by the derivation unit and a value on which an occurrence rate lower than the highest occurrence rate is derived by the derivation unit.

17 Claims, 14 Drawing Sheets

(51) Int. Cl.
*G06T 5/50* (2006.01)
*G06K 9/32* (2006.01)
*G06K 9/46* (2006.01)
*H04N 13/111* (2018.01)
*H04N 5/232* (2006.01)

(52) U.S. Cl.
CPC .............. *G06K 9/4609* (2013.01); *G06T 5/50* (2013.01); *H04N 5/232* (2013.01); *H04N 13/111* (2018.05)

(56) References Cited

U.S. PATENT DOCUMENTS

2013/0279773 A1* 10/2013 Masumoto ................ G06T 5/50
  382/128
2015/0043786 A1* 2/2015 Ohki ........................ G06T 7/215
  382/107

* cited by examiner

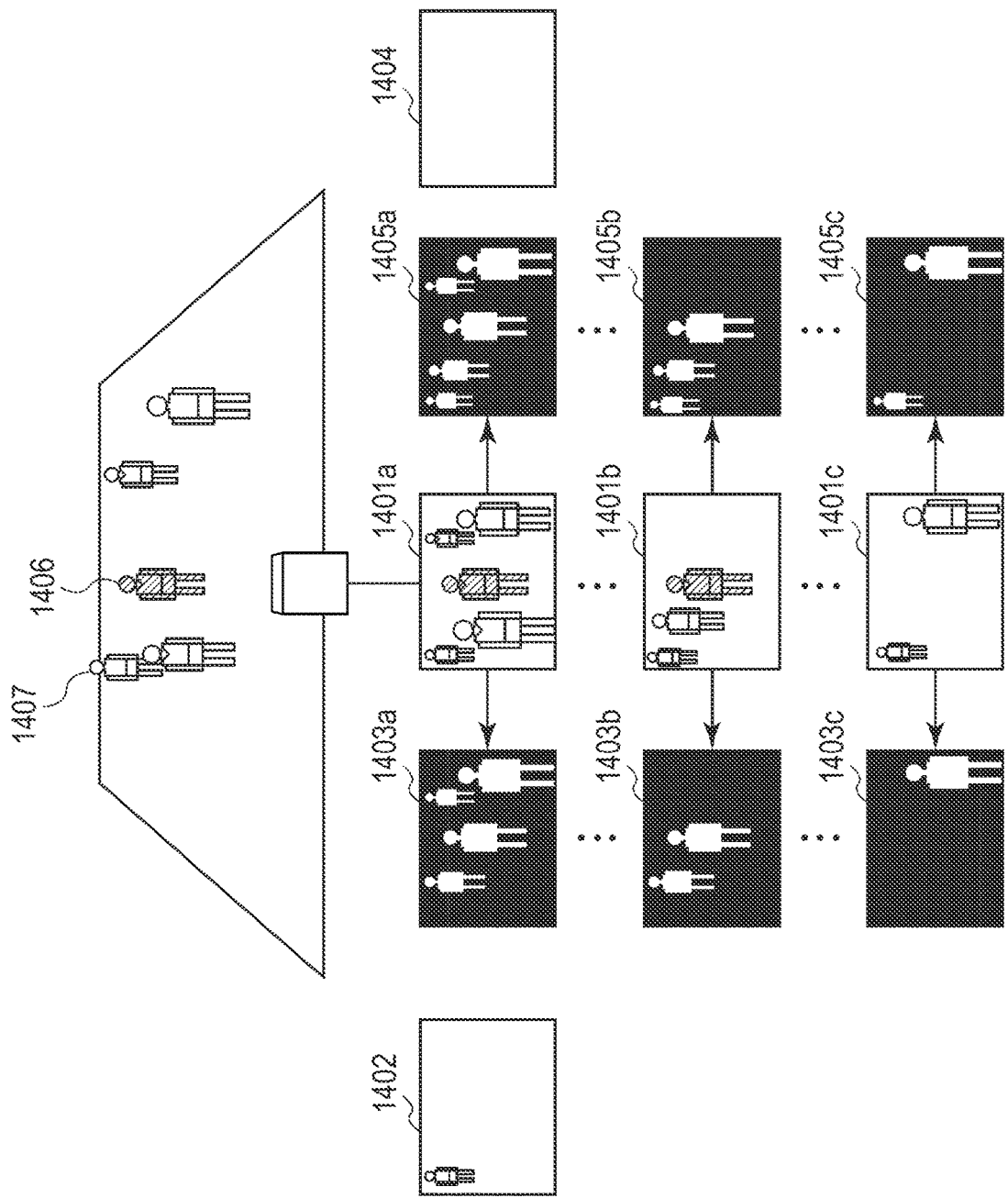

IMAGE PROCESSING APPARATUS, IMAGE PROCESSING METHOD, AND STORAGE MEDIUM

BACKGROUND OF THE INVENTION

Field of the Invention

The present invention relates to a technique to generate background image data using image data on a plurality of images.

Description of the Related Art

A method of extracting objects in a foreground (hereafter, also referred to as foreground objects) from an image is a background subtraction processing technique. In the background subtraction processing technique, foreground images including foreground objects are acquired by the subtraction between a background image depicting a background and target images from which the foreground objects are extracted. The foreground objects refer to predetermined objects included in a captured image. For example, assuming a soccer match or a rugby match, the predetermined objects are persons. In general, the persons mostly move through captured images captured over a predetermined time period.

Japanese Patent Application Laid-Open No. 2005-78195 describes a technique in which a plurality of images having different captured time is collected, and a background image is created using the collected images. Specifically, an occurrence rate histogram is created for each pixel, and the value of a middle frequency of each occurrence rate histogram is used as the value of the corresponding pixel in the background image.

The technique described in the Japanese Patent Application Laid-Open No. 2005-78195 however determines a foreground object as a background mistakenly when the foreground object is stationary during a certain time. The generation of a proper background image thereby fails. As a result, the extraction accuracy for the foreground object decreases.

SUMMARY OF THE INVENTION

According an aspect of the present invention, an image processing apparatus comprises: one or more hardware processors; and a memory for storing instructions to be executed by the one or more hardware processors, wherein when the instructions stored in the memory are executed by the one or more hardware processors, the image processing apparatus functions as: an acquiring unit configured to acquire image data; a derivation unit configured to derive an occurrence rate of a value corresponding to pixel data on a first region in each of a plurality of images corresponding to the image data acquired by the acquiring unit; and a determining unit configured to determine a value of the first region in a background image corresponding to the image data based on a plurality of values including a value on which a highest occurrence rate is derived by the derivation unit and a value on which an occurrence rate lower than the highest occurrence rate is derived by the derivation unit.

Further features of the present invention will become apparent from the following description of exemplary embodiments with reference to the attached drawings.

BRIEF DESCRIPTION OF THE DRAWINGS

FIG. 14 is a diagram used for describing an advantageous effect of an embodiment.

DESCRIPTION OF THE EMBODIMENTS

Figure 1:
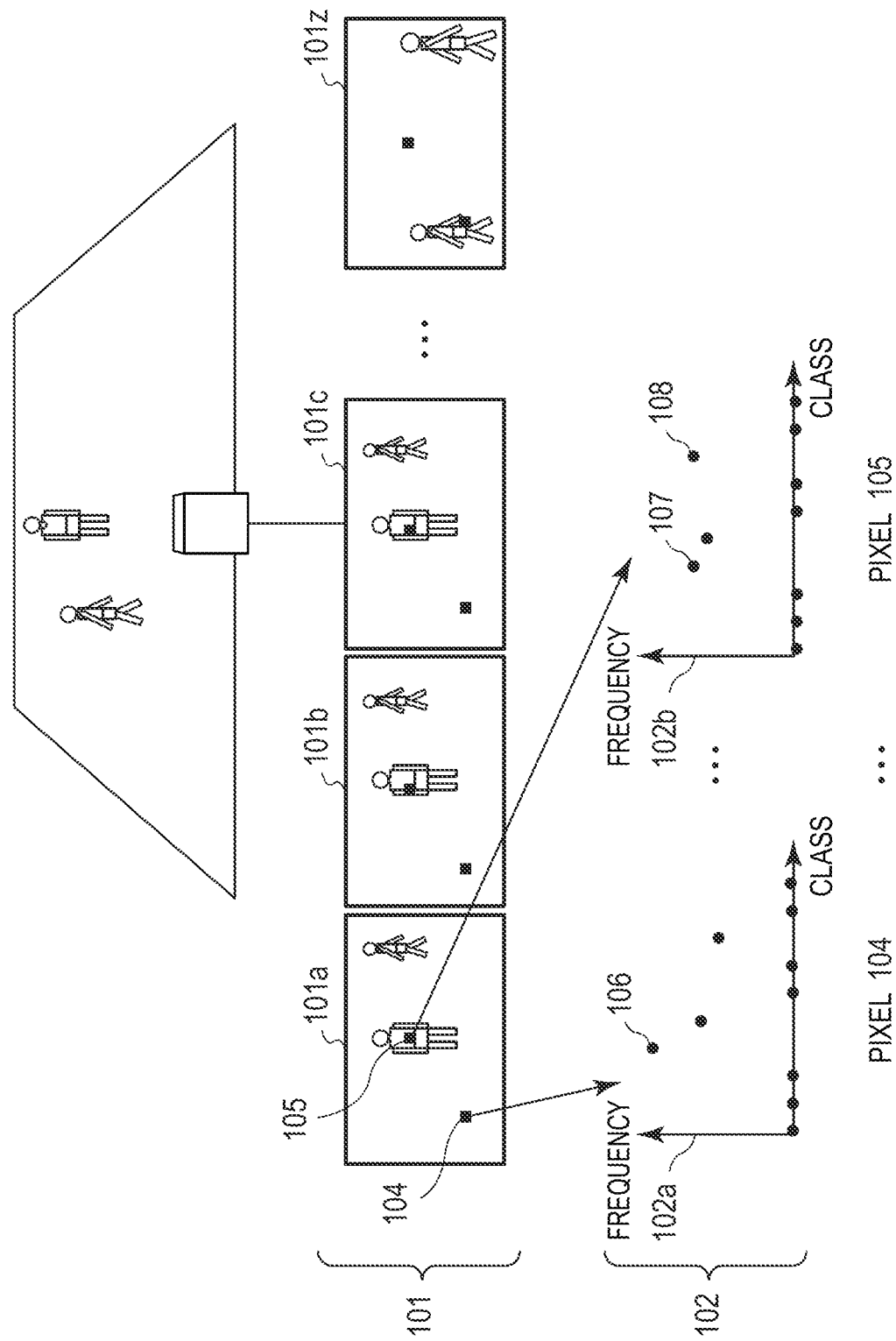
FIG. 1 is a diagram used for describing an outline of generating a background image and extracting a foreground.

Preferred embodiments of the present invention will now be described in detail in accordance with the accompanying drawings.

Hereafter, embodiments of the present invention will be described with reference to the drawings. The embodiments to be described below are not intended to limit the present invention, and all of the combinations of features described in these embodiments are not necessarily indispensable to a solution for the present invention. In the description, like reference numerals designate the same or identical components.

Embodiment 1

<Outline>

First, the outline of Embodiment 1 will be described. In the present embodiment, an image processing apparatus performs processing. The configuration of the image processing apparatus will be described later. In the present embodiment, the image processing apparatus generates distribution data by counting the statistical occurrence rates of the pixel values of each pixel over a plurality of image data items having different captured times. For example, in the case of focusing on a pixel at a predetermined position (hereafter referred to as a target pixel), the statistical occurrence rates of the pixel values of the target pixel (at the same pixel position) is counted over the plurality of image data items to determine distribution data on the target pixel. Based on the distribution data, the image processing apparatus generates a plurality of candidate data items on a pixel value corresponding to a target pixel in background image data. Of the plurality of candidate data items, the image processing apparatus selects a suitable candidate data item and determines the pixel value of the target pixel in the background image data based on the selected candidate data item. The background image data is generated by performing such a process on each pixel.

Using the generated background image data, the image processing apparatus then extracts foreground objects from image data on which a process for extracting the foreground objects is performed. The plurality of image data items having different captured times will be hereafter called time series image data items. In the present embodiment, the time series image data items are assumed to have the same number of pixels forming each of the time series image data items (the size of each image).

FIG. 1 is a diagram illustrating the outline of processing in the present embodiment. As illustrated in FIG. 1, time series image data items 101 includes a plurality of image data items 101a, 101b, 101c, . . . , 101z that comes sequentially in time. Note that when data items of the same kinds are described collectively, such data items may be written with their reference characters without alphabet letters as suffixes. In the present embodiment, first, a tendency in the distribution of pixel values is drawn for each pixel from the time series image data items 101 being image data items from which foreground objects are extracted. The tendency in the distribution of pixel values is expressed, for example, in the forms of distribution data 102 obtained by counting occurrence rates of pixel values at a predetermined pixel position in the time series image data items 101. The distribution data 102 is data generated for each pixel. FIG. 1 illustrates a distribution data item 102a on a pixel 104 and a distribution data item 102b on a pixel 105, as an example. The distribution data 102 may be generated not for each pixel but for each predetermined block. The distribution data 102 is not necessarily generated for all pixels. For example, the distribution data 102 may not be generated for pixels in a region not used for generating a background image.

In FIG. 1, the distribution data 102 is expressed in the forms of two-dimensional space each having the axes of luminance value and frequency obtained by converting the pixel values. The manner how to express the distribution data 102 is however not limited to this manner. The distribution data 102 may be expressed in the form of two-dimensional space constituted by color in an alternative color space such as HSV and Lab into which pixel values are converted, and frequency. Alternatively, the distribution data 102 may be expressed in the form of a multidimensional space of four or more dimensions constituted by pixel value of three RGB channels and frequency. In the present embodiment, distribution data obtained by quantizing pixel values with a wide width and totalizing the quantized pixel values into frequencies is used as the distribution data 102. For example, assuming that the width of the quantization is 10, the number of pixels having pixel values of 0 to 9 is counted as the frequency of a pixel value 0, and the number of pixels having pixel values of 50 to 59 is counted as the frequency of a pixel value 50. This improves a robustness against minute fluctuations of pixel values. Hereafter, a section of pixel value over which the totalization is made is called a class. The distribution data 102 illustrated in FIG. 1 is data representing frequencies on the basis of class.

In the time series image data items 101, in general, foreground objects are objects mostly moving, while a background is mostly stationary. Therefore, in the distribution data item 102a corresponding to the pixel 104 in the time series image data items 101, an occurrence rate 106 of a class corresponding to a pixel value that has to be considered as the background at the location of the pixel 104 is the highest of the frequencies of all classes in the distribution data item 102a. In contrast, as with the pixel 105, there is a case where a foreground object (a person in the example illustrated in the drawing) is temporarily stationary. In the distribution data item 102b corresponding to this pixel 105, an occurrence rate 107 of the class corresponding to the pixel value that has to be considered as the background is higher than the frequencies of the other classes except for an occurrence rate 108 but equal to or lower than the occurrence rate 108 of the class corresponding to a pixel value of the foreground object. That is, when a class (pixel value) is determined based on a mode value of the occurrence rate, there is the risk of selecting a pixel value of a foreground object rather than a pixel value of a background.

Hence, in the present embodiment, the image processing apparatus selects a plurality of classes with high occurrence rates as candidates for a class corresponding to the pixel values of pixels forming background image data. Next, for each of the selected candidates for the class, the image processing apparatus determines the candidate's background dominance. In the case where the time series image data items are data items on a captured person, the person being a foreground object is not totally stationary but moves slightly in many cases. That is, considering pixels lying at the same positions in image data items of the time series image data items, the variations of a pixel value of a foreground object are larger than the variations of a pixel value of the background. In the present embodiment, the image processing apparatus therefore calculates the variation of pixel values included in the same class for each candidate for a class, and determines that a candidate with a smaller variation has a higher background pixel dominance. Conversely, a candidate with a larger variation is determined to have a lower background pixel dominance. For example, assume a case where three classes C1, C2, and C3 are selected as candidates for a class of pixel values of a pixel at a pixel position Px. At that point, the image processing apparatus extracts pixel values at the pixel position Px in each image data item of the time series image data items, which are pixel values included in, for example, the class C1 (e.g., pixel values of 50 to 59), and derives the variation of the extracted pixel values. Similarly, for each of the classes C2 and C3, the image processing apparatus extracts pixel values included in the class and derives the variation of the extracted pixel values. The image processing apparatus then determines the dominances of the classes in such a manner that a class with a lower derived variation is given a higher background pixel dominance.

Based on the dominances determined for the candidates for the class in such a manner, the image processing apparatus determines a candidate for a class with a highest dominance and uses pixel values included in the determined class to determine a pixel value of the target pixel in the background image data. The image processing apparatus performs such a process on all of the pixels included in the time series image data items 101 one by one to generate the background image data. The image processing apparatus then compares the generated background image data with the time series image data items 101 to extract the foreground objects. The above is the outline of the processing performed in the present embodiment.

<Configuration of Image Processing Apparatus>

Figure 2:
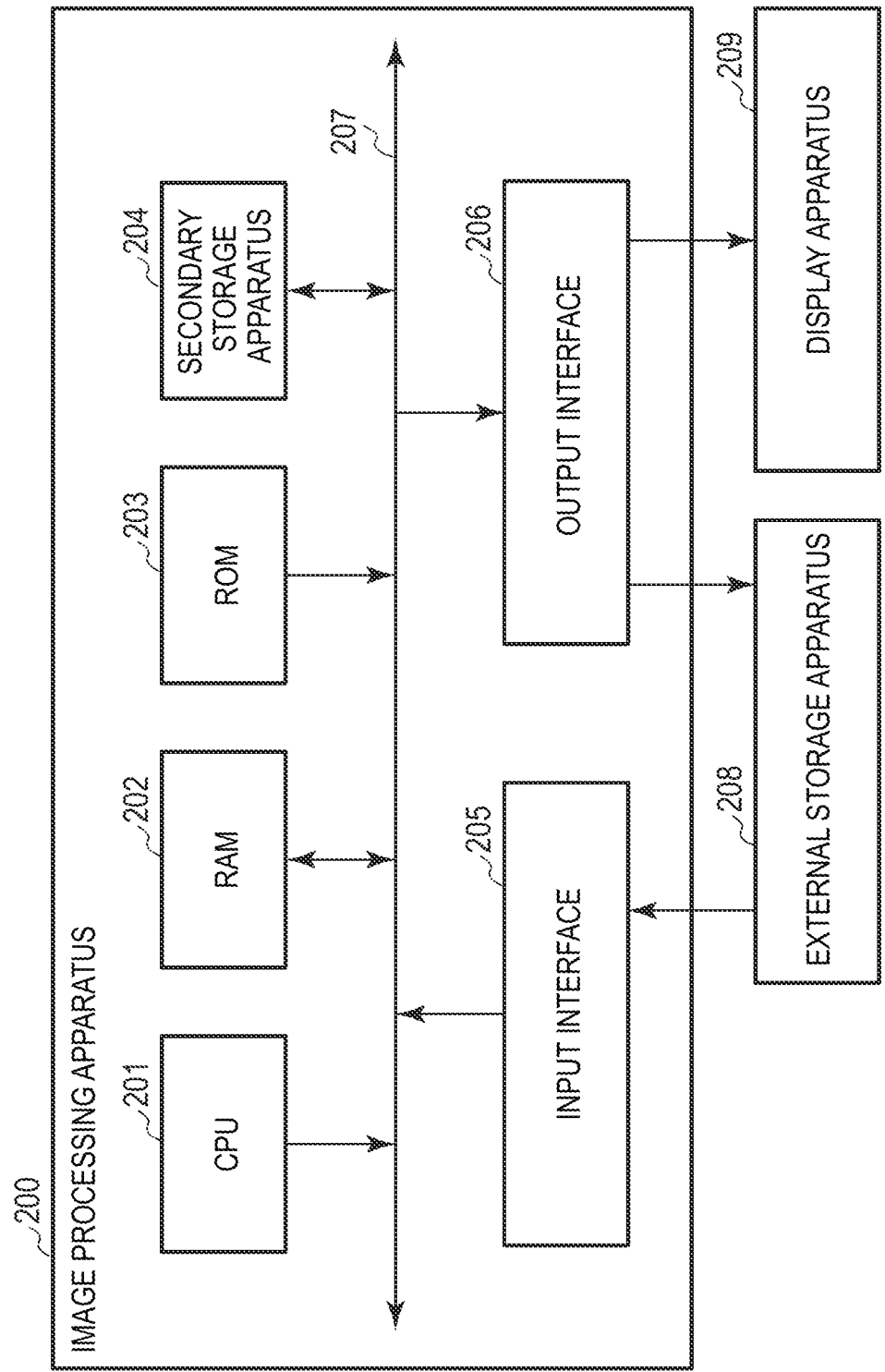
FIG. 2 is a block diagram used for describing a hardware configuration of an image processing apparatus.

FIG. 2 is a diagram illustrating an example of a hardware configuration of the image processing apparatus of the present embodiment. An image processing apparatus 200 of the present embodiment includes a CPU 201, a RAM 202, a ROM 203, a secondary storage apparatus 204, an input interface 205, and an output interface 206. The components of the image processing apparatus 200 are connected to one another through a system bus 207. The image processing apparatus 200 is connected to an external storage apparatus 208 via the input interface 205 and connected to the external storage apparatus 208 and a display apparatus 209 via the output interface 206.

The CPU 201 is a processor configured to execute programs stored in the ROM 203 using the RAM 202 as a working memory, so as to control the components of the image processing apparatus 200 collectively through the system bus 207. The CPU 201 performs various processes to be described later.

The secondary storage apparatus 204 is a storage apparatus configured to store various kinds of data treated by the image processing apparatus 200, and an HDD is used as the secondary storage apparatus 204 in the present embodiment. The CPU 201 can write data onto the secondary storage apparatus 204 and read data stored in the secondary storage apparatus 204, through the system bus 207. As the secondary storage apparatus 204, various storage apparatuses can be used in addition to the HDD, such as an optical disk drive and a flash memory.

The input interface 205 is a serial bus interface such as USB and IEEE 1394, for example. Via the input interface 205, the input of data, instructions, and the like from external apparatuses to the image processing apparatus 200. Via the input interface 205, the image processing apparatus 200 acquires data from the external storage apparatus 208 (e.g., a storage medium such as a hard disk, memory card, CF card, SD card, and USB memory). The input interface 205 can be connected to input devices such as a mouse, buttons, and the like (not illustrated). The output interface 206 includes, as with the input interface 205, a serial bus interface such as USB and IEEE 1394. Additionally, for example, a video output terminal such as DVI and HDMI can be used. Data and the like is output from the image processing apparatus 200 to external apparatuses via the output interface 206. The image processing apparatus 200 is configured to output a processed image through the output interface 206 to the display apparatus 209 (various image display device such as a liquid crystal display), so as to display the image. The image processing apparatus 200 may also include components other than those described above, but the description of such components will be omitted.

<Functional Block Diagram>

Figure 3:
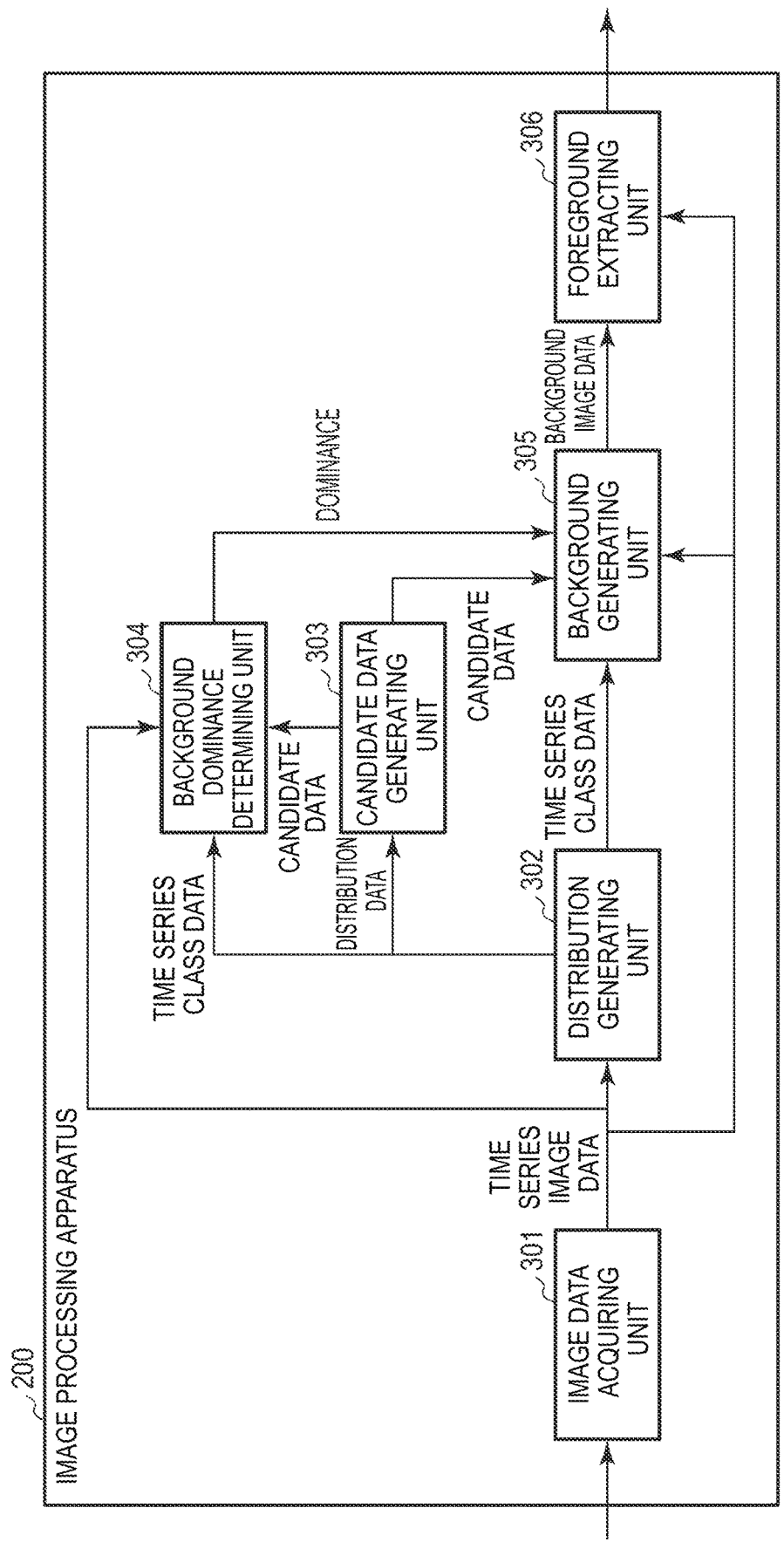
FIG. 3 is a block diagram used for describing a functional configuration of the image processing apparatus.

FIG. 3 is a block diagram illustrating a functional configuration of the image processing apparatus 200. The image processing apparatus 200 functions as components illustrated in FIG. 3 by causing the CPU 201 execute programs stored in the ROM 203 using the RAM 202 as a working memory.

The image processing apparatus 200 includes an image data acquiring unit 301, a distribution generating unit 302, a candidate data generating unit 303, a background dominance determining unit 304, a background generating unit 305, and a foreground extracting unit 306.

The image data acquiring unit 301 is configured to acquire time series image data items on which a process of extracting objects in a foreground is performed. That is, the image data acquiring unit 301 is configured to acquire a plurality of image data items obtained by capturing the same scene at a plurality of different times. The image data acquiring unit 301 is configured to acquire the time series image data items via the input interface 205 or from the secondary storage apparatus 204. The time series image data items are output to the distribution generating unit 302, the background dominance determining unit 304, the background generating unit 305, and the foreground extracting unit 306.

The distribution generating unit 302 is configured to generate distribution data items and time series class data items from the time series image data items. The distribution data items are each a data item representing a statistical distribution of the pixel values of pixels forming each image data item in the time series image data items. The time series class data is data representing classes of the target pixel in image data items in the time series image data acquired by the image data acquiring unit 301, and the provided number of items of the time series class data is the same as the number of items of the time series image data. The distribution data items and the time series class data items will be described later in detail. The time series class data items are sent to the background dominance determining unit 304 and the background generating unit 305. The distribution data items are output to the candidate data generating unit 303.

The candidate data generating unit 303 is configured to generate candidate data based on the distribution data items. The candidate data is data that can become a candidate used to determine pixel values of the background image data. In the present embodiment, the candidate data generating unit 303 is configured to generate a plurality of items of the candidate data. The details thereof will be described later. The candidate data is output to the background dominance determining unit 304 and the background generating unit 305.

The background dominance determining unit 304 is configured to determine a dominance representing a likelihood of being the background based on the time series class data items and the candidate data. The details thereof will be described later. The dominance is output to the background generating unit 305.

The background generating unit 305 is configured to generate background image data based on the time series image data items, the time series class data items, and the dominance. The generated background image data is output to the foreground extracting unit 306. The details thereof will be described later.

The foreground extracting unit 306 is configured to extract foreground objects based on the time series image data items and the background image data. That is, the foreground extracting unit 306 is configured to compare the background image data and the image data items of the time series image data items to generate foreground image data items corresponding to the image data items of the time series image data items. The foreground extracting unit 306 is configured to output the foreground image data to the secondary storage apparatus 204, the external storage apparatus 208, and the display apparatus 209. The foreground extracting unit 306 may also output the background image data too.

<Description of Flowchart>

Figure 4:
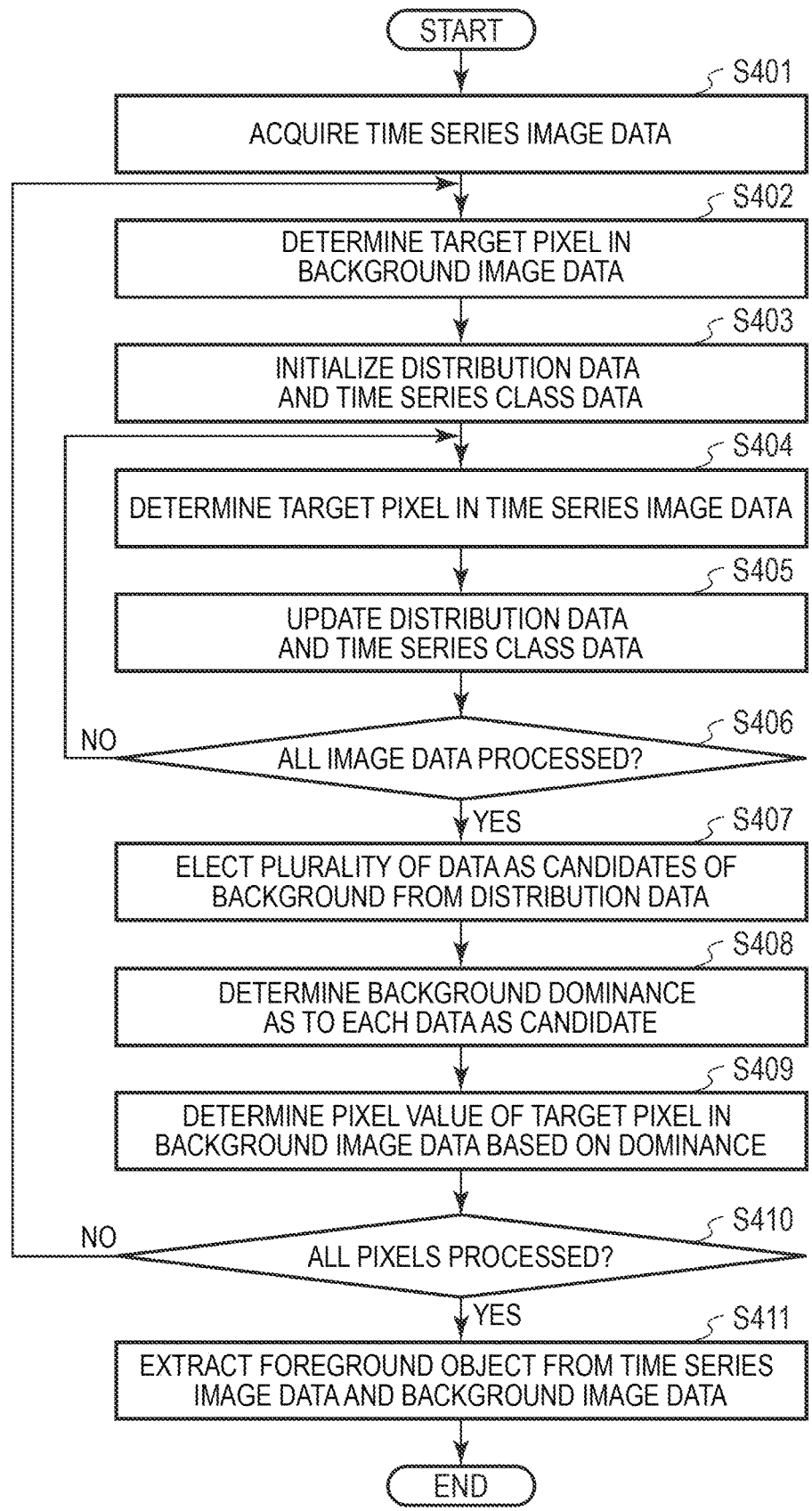
FIG. 4 is a flowchart used for describing a flow of processing.

FIG. 4 is a flowchart illustrating an example of processing in the present embodiment. In the image processing apparatus 200, the CPU 201 executes programs stored in the ROM 203 using the RAM 202 as a working memory, so as to perform a series of processes illustrated in the flowchart illustrated in FIG. 4. Note that all of the processes described below are not necessarily performed by the CPU 201, and the image processing apparatus 200 may be configured such that some or all of the processes are performed by one or more processing circuits other than the CPU 201.

In step S401, the image data acquiring unit 301 acquires the time-series image data. In the present embodiment, the description is given assuming a case where the position and attitude of a camera by which the time series image data is acquired is unchanged for all images included in the time series image data, as an example. The present embodiment is however applicable to a case where the position and attitude of the camera is slightly changed between a plurality of images included in the time series image data. How to perform processing in such a case will be described later. In the present embodiment, the description is given of a case where the acquired time series image data is formed of color images of three RGB channels. The present embodiment is however similarly applicable to a case where the time series image data is formed of gray images of one channel. In the present embodiment, the image data acquiring unit 301 associates the image data items of the time series image data with numbers for distinguishing captured times (hereafter, referred to as captured time numbers) so that the image data items can be distinguished from one another. The image data acquiring unit 301 is configured to output the acquired time series image data to the distribution generating unit 302, the background dominance determining unit 304, the background generating unit 305, and the foreground extracting unit 306.

In step S402, the background generating unit 305 determines the target pixel, which is a pixel on which a process for determining a pixel value of the background image data. The background image data is image data representing one or more background images in the time series image data, and the image size of the background image data is equivalent to the image size of the image data items of the time series image data. In the present embodiment, one background image data item is generated from a plurality of image data items (all of the image data items or some image data items) of the time series image data. The present embodiment is however similarly applicable to a case where a background image data item is generated for each image data item of the time series image data. How to perform processing in such a case will be described later. In the present embodiment, the top-left pixel in the background image data is selected as the target pixel. Then, every time the determination of a pixel value of the background image data is completed, a pixel that has not been selected as the target pixel is selected as a new target pixel. Note that the order of selecting the target pixel is not limited to this, and the target pixel may be selected in any order.

Figure 5:
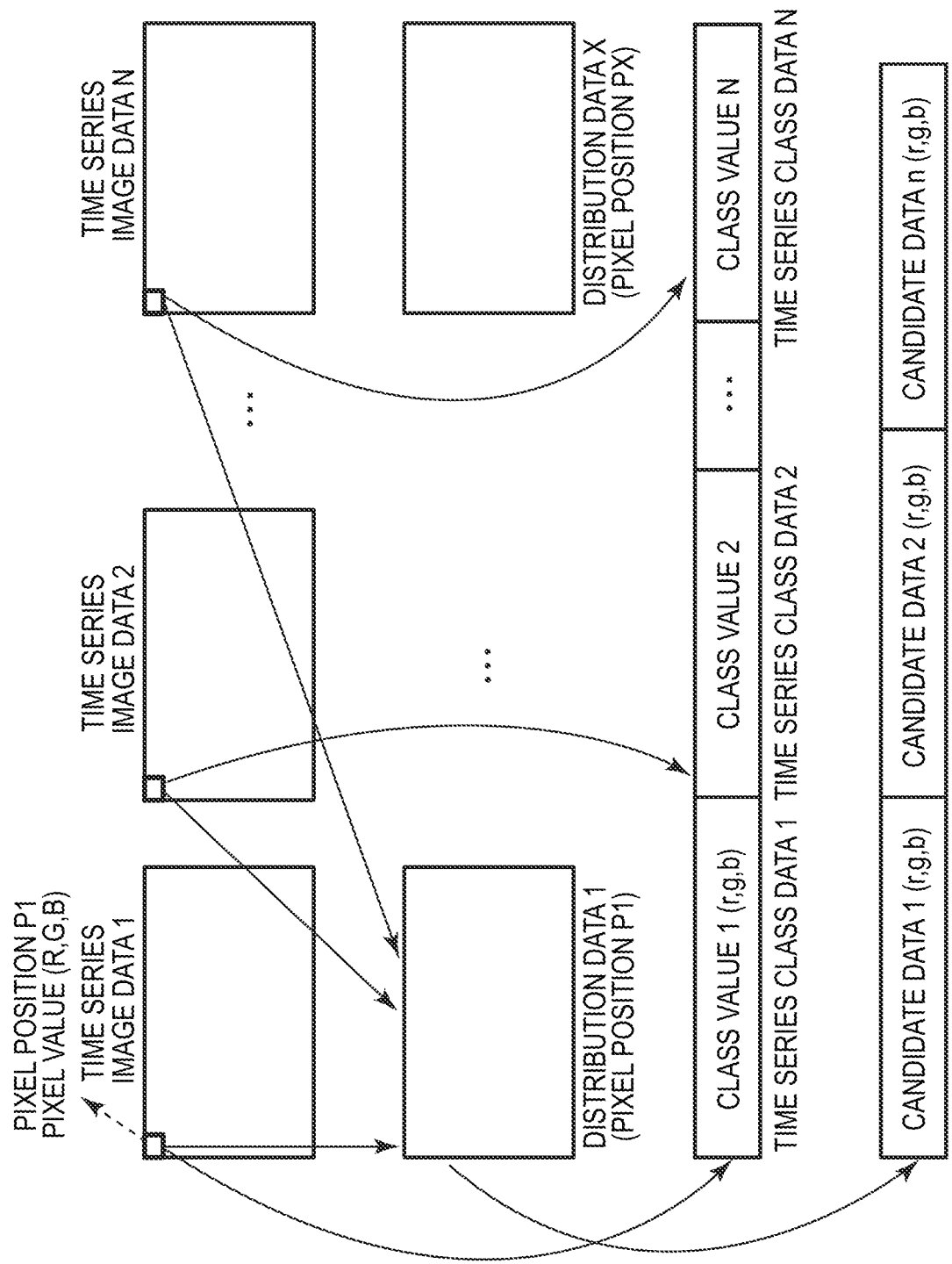
FIG. 5 is a diagram used for describing an outline of kinds of data.

In step S403, the distribution generating unit 302 initializes the distribution data and the time series class data. FIG. 5 is a diagram illustrating kinds of data in the present embodiment in outline. Referring to FIG. 5, the distribution data and the time series class data will be described.

The distribution data is made by counting, for each class, the occurrence rate of pixel values in the each class in the time series image data. That is, the distribution data is data representing the occurrence rate of pixel values of a pixel at a predetermined position (the target pixel) in the time series image data, and distribution data items for the number of pixels will be generated. In the present embodiment, the distribution generating unit 302 is configured to generate the distribution data based on pixel values quantized with a width determined beforehand. As described above, for example, assuming that the width of the quantization is 10, the number of pixels having pixel values of 0 to 9 is counted as the frequency of a class value 0, and the number of pixels having pixel values of 50 to 59 is counted as the frequency of a class value 50. In the present embodiment, the time series image data is supposed to be formed of color images of three RGB channels. The distribution data is therefore represented in a four dimensional space consisting of an axis of R class, an axis of G class, an axis of B class, and an axis of frequency. The distribution generating unit 302 performs the initialization by substituting zero into all of the frequencies in a distribution data.

The time series class data is data representing classes of the target pixel in image data items in the time series image data acquired by the image data acquiring unit 301. The number of data items included in the time series class data is therefore equivalent to the number of image data items included in the time series image data. The time series class data is used in a process in step S408 of determining dominances of candidate data items on the background and a process in step S409 of determining a final pixel value of the background from the candidate data items, which will be described later. In the present embodiment, since the distribution data is represented in the four dimensional space consisting of the axes of the three classes and the axis of frequency, the time series class data holds a set of three class values for each data item. The time series class data items are each stored being associated with a captured time number of each image data item in the time series image data acquired by the image data acquiring unit 301. The distribution generating unit 302 initializes the time series class data. That is, all values of the time series class data are set at zero.

Returning to FIG. 4, the description will be continued. In step S404, the distribution generating unit 302 determines an image data item in the time series image data acquired by the image data acquiring unit 301 to be used to update the distribution data (hereafter, referred to as "target image data"). In the present embodiment, an image data item captured at the earliest time in the time series image data is selected as the target image data. Then, every time the update of the distribution data and the time series class data is completed, an image data item that has not been selected as the target image data yet is selected as new target image data, in increasing order of time toward an image data item captured at the latest time. Note that the order of selecting the target image data is not limited to this, and the target image data may be selected in any order.

In step S405, the distribution generating unit 302 uses the pixel value of the target pixel determined in step S402 in the target image data determined in step S404 to update the distribution data and the time series class data. A method for updating the distribution data and the time series class data will be described below specifically.

The distribution generating unit 302 takes a pixel value $I^t_k(x0, y0)$ of the target pixel (x0, y0) in the target image data, from the time series image data. t is an index for identifying a captured time number hold in the target image data. k is an index for identifying a channel of the three RGB channels.

Next, the class to which the pixel value $I^t_k(x0, y0)$ belongs is derived using the following Formula (1), for each channel.

$$\text{class}^t_k(x_0, y_0) = [I^t_k(x_0, y_0) \div w] \times w \qquad (1)$$

Here, w denotes the width of pixel value used in the quantization, and a class value is determined in the form of a quotient of the taken pixel value divided by the width w. By Formula (1), the class value of the R channel, the class value of the G channel, and the class value of the B channel are derived for the target pixel (x0, y0). Note that the method for deriving the classes is not limited to the above Formula (1). Another method capable of determining the classes based on a width determined beforehand may be used.

Finally, the distribution generating unit 302 updates the distribution data by adding one to the value of frequency at a point corresponding to the derived three classes. The distribution generating unit 302 updates the time series class data by replacing the set of values of three classes held at a captured time number t in the time series class data with the derived three (three channels) class values.

In step S406, the distribution generating unit 302 determines whether the processes have been finished for all of the image data items in the time series image data. When the processes have been finished, the flow proceeds to step S407. At the time of proceeding to step S407, the distribution generating unit 302 outputs the updated distribution data to the candidate data generating unit 303 and outputs the time series class data to the background dominance determining unit 304 and the background generating unit 305. When the processes have not been finished yet, the flow returns to step S404. As seen from the above, in the processes from step S404 to step S406, the distribution data item on the target pixel is generated, and the time series class data corresponding to the target pixel is generated, with the target image data changed and the target pixel fixed.

In step S407, the candidate data generating unit 303 uses the distribution data acquired from the distribution generating unit 302 to select candidate data items having a likelihood of being a pixel value of the background image data, for a number determined beforehand and under predetermined conditions. The description is given below assuming that the number of the selected candidate data items is n. In the present embodiment, each candidate data item holds a set of three class values used to generate the distribution data. A method for selecting the candidate data items will be described below specifically.

First, the candidate data generating unit 303 detects a point of the highest frequency in the distribution data and selects a set of values of three classes at the point as a first candidate data item. Next, the candidate data generating unit 303 detects a point of the highest frequency in the distribution data next to the previously selected point and selects a set of values of three classes at the point of the highest frequency in the distribution data next to the previously selected point as a second candidate data item. By repeating such a process n times, all candidate data items are selected (see also FIG. 5). The candidate data generating unit 303 outputs the selected candidate data items to the background dominance determining unit 304 and the background generating unit 305. Note that the candidate data items may not be necessarily selected for the number determined beforehand. For example, frequencies having occurrence rates lower than a predetermined threshold value may not be selected as candidate data items. Alternatively, rather than selecting the n highest occurrence rates, frequencies having occurrence rates equal to or higher than a predetermined threshold value may be selected as candidate data items.

In step S408, the background dominance determining unit 304 determines a background dominance for each of the candidate data items acquired from the candidate data generating unit 303. The dominance is determined using a candidate data item acquired from the candidate data generating unit 303, the time series class data acquired from the distribution generating unit 302, and the time series image data acquired from the image data acquiring unit 301.

Figure 6:
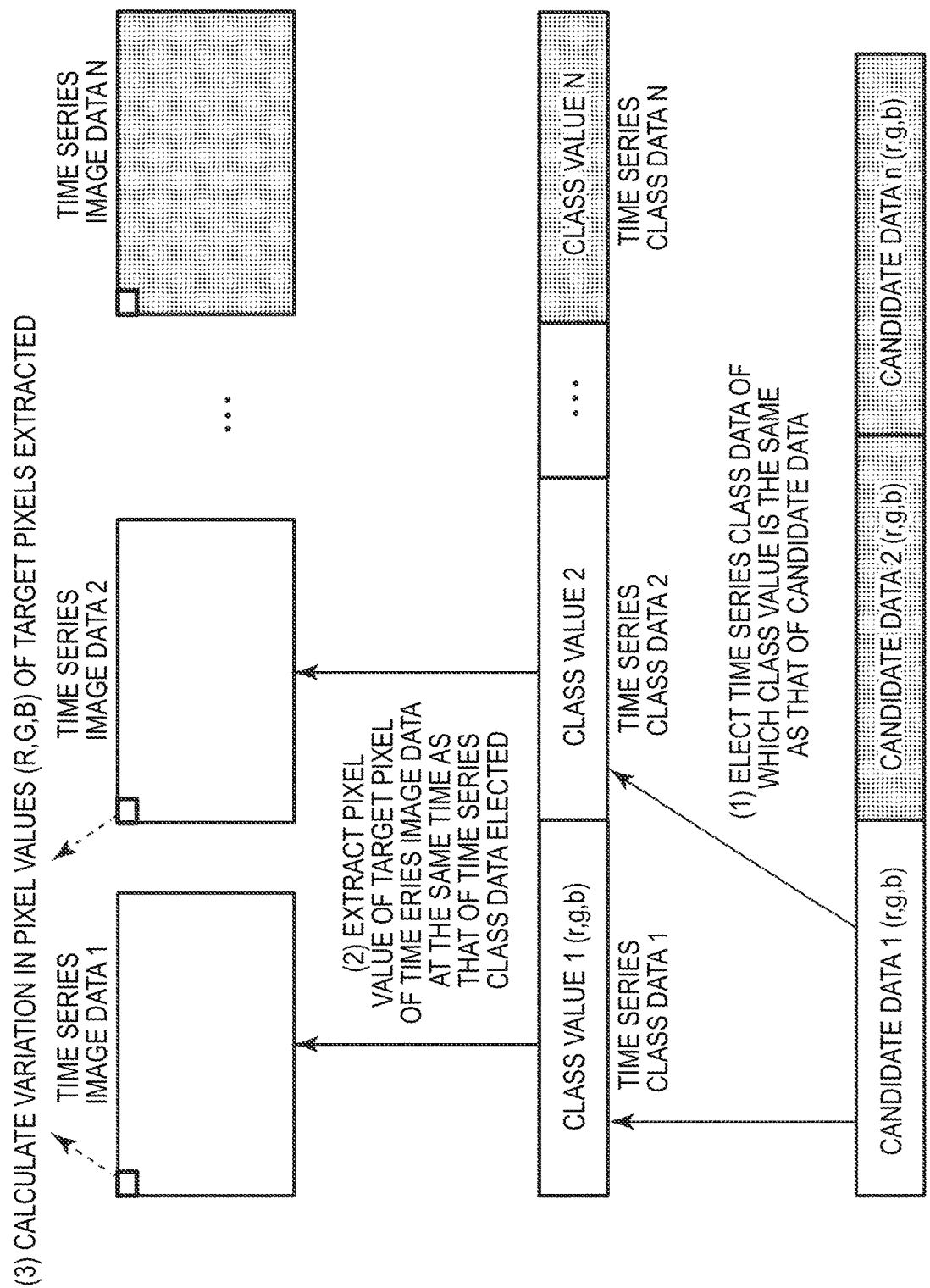
FIG. 6 is a diagram used for describing an outline of processing to determine a dominance.

FIG. 6 is a diagram illustrating an outline of processing to determine the dominance. Referring to FIG. 6, a method for determining the dominance will be described below specifically. In the method for determining the dominance, the following processes are performed on each data item included in the candidate data items.

First, the background dominance determining unit 304 selects all captured time numbers of time series class data items of which sets of three class values of the time series class data items are the same as a set of three class values (class$_r$, class$_g$, class$_b$) in a candidate data item. In FIG. 6, (r, g, b) indicates a set of three class values. The number of the selected captured time numbers is equivalent to the frequency of a point of the three class values (class$_r$, class$_g$, class$_b$) in the distribution data, from the nature of the distribution data.

Next, the background dominance determining unit 304 extract all pixel values $Id^j_k(x0, y0)$ of the target pixel in the time series image data corresponding to the selected captured time numbers, from the time series image data. Here, j is an index for identifying an extracted pixel value. k is an index for identifying a channel of the three RGB channels.

Finally, from the extracted pixel values, the background dominance determining unit 304 determines the dominance using the following Formula (2).

$$D_i(x_0, y_0) = \frac{1}{\sqrt{\sum_{k=1}^{3} \frac{1}{m}\Sigma_j^m (Id^j_k(x_0, y_0) - \overline{Id_k(x_0, y_0)})^2}} \quad (2)$$

Here, m denotes the total number of the time series image data items from which the pixel values are extracted. Di denotes the dominance at the target pixel (x0, y0). i denotes an index for identifying each data item of the candidate data items. The dominance Di determined by Formula (2) increases as the variations of the extracted pixel values becomes smaller. That is, the dominance Di are pixel values corresponding to a class indicated by a candidate data item being processed and increases as the variation of pixel values of the target pixel in the time series image data becomes smaller. The dominance used is not limited to this and any kind of value indicating the variation of pixel values may be used as the dominance.

After performing the above process on each data item included in the candidate data items, the background dominance determining unit 304 outputs the determined dominance to the background generating unit 305 for each data item.

For example, in a time period during which the time series image data is captured, a scene of a person being stationary in a region S including the target pixel for a predetermined time is assumed to be a scene A. A scene of the person being absent in the region S (i.e., a scene of the person having left the region S) is assumed to be a scene B. In the scene A and the scene B, different objects are captured in the region S, and as for the candidate data, different candidate data items corresponding to the different scenes are to be generated. Here, even when being stationary, the person is not completely stationary but often moves slightly. That is, in the candidate data item corresponding to the scene A, the variation of pixel values is large, and thus the dominance Di of the candidate data item corresponding to the scene A is small. In contrast, the background does not move slightly. That is, in the candidate data item corresponding to the scene B, the variation of pixel values is small, and thus the dominance Di of the candidate data item corresponding to the scene B is large.

In step S409, the background generating unit 305 determines a pixel value in the background image data based on the candidate data items, the dominance, and the time series image data.

Figure 7:
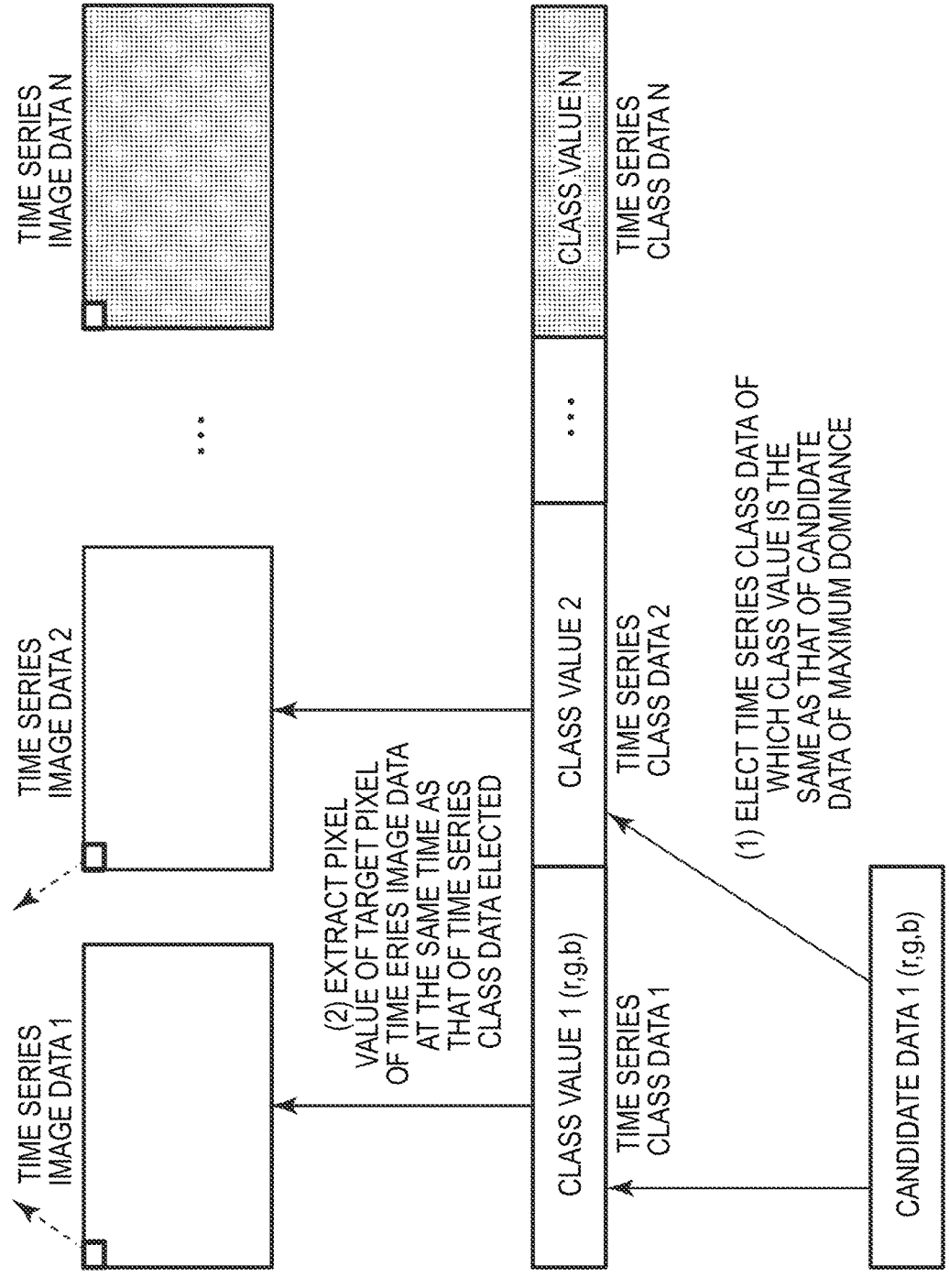
FIG. 7 is a diagram used for describing an outline of processing to determine a pixel value of background image data.

FIG. 7 is a diagram illustrating an outline of processing to determine a pixel value in the background image data. First, the background generating unit 305 selects a candidate data item having the largest dominance from the candidate data items and extracts a set of three class values hold by the selected candidate data item.

Next, the background generating unit 305 selects all captured time numbers of time series class data items of which sets of three class values of the acquired time series class data items are the same as the extracted set of three class values.

Next, the background generating unit 305 extracts pixel values $Id^j_k(x0, y0)$ of the target pixel in the time series image data corresponding to the selected captured time numbers. Then, using the extracted pixel values $Id^j_k(x0, y0)$, the background generating unit 305 derives a pixel value $Ib_k(x0, y0)$ of the target pixel in the background image data with the following Formula (3). Here, j is an index for identifying an extracted pixel value. k is an index for identifying a channel of the three RGB channels.

$$Ib_k(x_0, y_0) = \frac{1}{m}\Sigma_j^m Id_k^j(x_0, y_0) \quad (3)$$

Here, m denotes the number of the extracted captured time numbers, and j denotes an index for identifying a pixel value data item. As shown in Formula (3), in the present embodiment, an example in which the average value of a plurality of pixel values is used as a pixel value in the background image data is described. However, the method for determining a pixel value in the background image data is not limited to this, and a method using median value of a plurality of pixel values may be employed.

The pixel value data items $Id^j_k(x0, y0)$ of the target pixel in the time series image data extracted by the background generating unit 305 are pixel values included in a class indicated by the class value of a candidate data item having the largest dominance. The largest dominance means that the variation of these extracted pixel values is small.

In step S410, the background generating unit 305 determines whether the processes from step S402 to step S409 have been performed on all of the pixels in the background image data. When the result of the determination in step S410 is true, the background generating unit 305 outputs the generated background image data to the foreground extracting unit 306, and the flow proceeds to step S411. In contrast, when the result of the determination in step S410 is false, the flow returns to step S402.

In step S411, the foreground extracting unit 306 extracts regions of foreground objects from the time series image data acquired from the image data acquiring unit 301 and the background image data acquired from the background generating unit 305. Specifically, the foreground extracting unit 306 derives the sum of squared differences between background image data Ib and time series image data I for each pixel, as shown in the following Formula (4). Then, regarding pixels of which the sums of squared differences are greater than a threshold value as pixels in image regions of foreground objects, the foreground extracting unit 306 extracts the regions of the foreground objects to generate image data If. The image data If generated in such a manner represents a binary image, where a pixel value corresponding to a pixel in the image region of a foreground object is replaced with 1, and a pixel value corresponding to a pixel in the image region of the background is replaced with 0.

This process is performed for each image data item included in the time series image data, and the image data If including the extracted regions of the foreground objects is generated for each image data item.

$$If(x, y) = \begin{cases} 1 \text{ if } \sum_{k=1}^{3} (Ib_k(x, y) - I_k^t(x, y))^2 \geq Th \\ 0 \text{ if } \sum_{k=1}^{3} (Ib_k(x, y) - I_k^t(x, y))^2 < Th \end{cases} \quad (4)$$

Here, Th denotes the threshold value, k denotes an index for identifying a channel of the three RGB channels, and t denotes an index for identifying an image included in the time series image data. The threshold value Th used here is determined based on the maximum value of the pixel values. A value less than 20% of the maximum value of the pixel values, for example, a value being 5% of the maximum value may be used as the threshold value. In such a manner, the foreground extracting unit 306 functions as a foreground image data generating unit. The foreground extracting unit 306 outputs the generated image data If to the secondary storage apparatus 204, the external storage apparatus 208, and the display apparatus 209, and the series of processes is thereby completed.

<Advantageous Effect>

Figure 8:
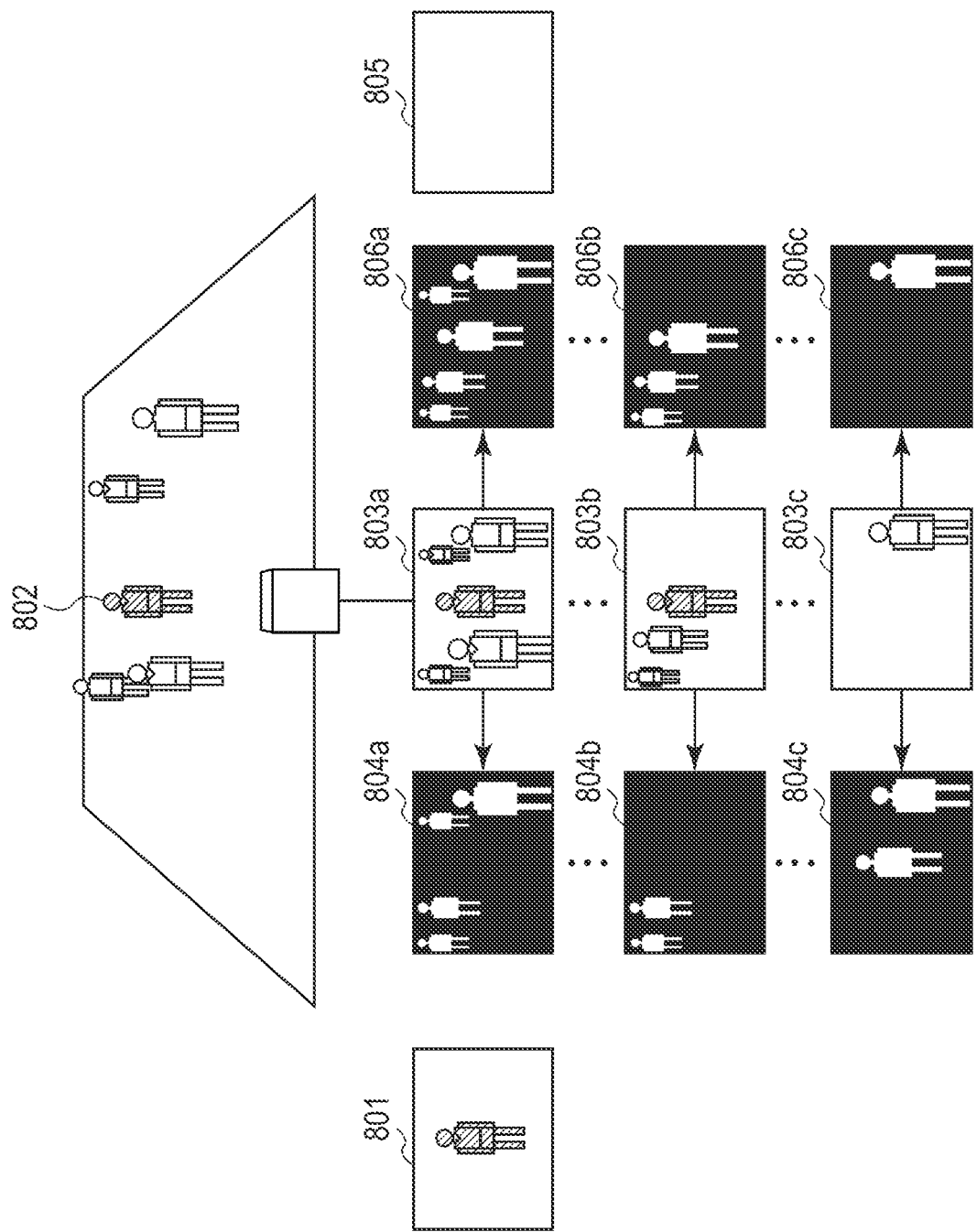
FIG. 8 is a diagram used for describing an advantageous effect of an embodiment.

FIG. 8 is a diagram illustrating an advantageous effect of the present embodiment. Background image data 801 represents background image data generated based on a plurality of image data images captured on a time series basis. The background image data 801 is however unlike the background image data generated according to the method of the present embodiment and is background image data generated according to a method using a pixel value of a highest frequency (class value). The background image data 801 includes a foreground object 802. The reason of this is that a person being the foreground object 802 does not move but is present at the same position for a certain period of time when sequential image data (time series image data) used to generate the background image data is captured. That is, the person being the foreground object 802 is present at the same position for a certain period of time and does not move, the result of which is the foreground object 802 that should be extracted as a foreground object is mistakenly identified as the background. In a case where this background image data 801 is used to extract the region of a foreground object from time series image data 803, foreground image data 804 is acquired. In the foreground image data 804, a region of foreground objects other than the foreground object 802 that move almost all the time are successfully extracted. On the other hand, as illustrated in foreground image data items 804a, 804b, a region of the foreground object 802 being stationary fails to be extracted. Alternatively, as illustrated in a time series image data item 803c, if the person corresponding to the foreground object 802 starts to move from a stationary state, a foreground as illustrated in a foreground image data item 804c is extracted. That is, a region intrinsically including no persons is mistakenly extracted as a region of the foreground object 802.

In contrast, the present embodiment includes processing in which a plurality of candidate data items for background image data is generated from time series image data, and a background dominance is determined for each of the candidate data items. Then, the dominance is used to generate the background image data 805. The background image data 805 is identified as the background also in the region of the foreground object 802. In a case where the background image data 805 is used to extract the region of a foreground object from time series image data 803, foreground image data 806 is to be acquired. In the foreground image data 806, the region of the foreground object 802 being stationary for a certain period of time is successfully extracted with high accuracy. As seen from the above, the present embodiment enables a proper background image to be generated using a plurality of images that comes sequentially in time, regardless of a state of an object such as the presence or absence of a change (movement, etc.) in the object with time. As a result, the regions of the foreground objects are successfully extracted with high accuracy.

Embodiment 2

<Outline>

In Embodiment 1, an aspect in which a plurality of candidate data items that can be determined as a pixel value in a background are selected from distribution data generated from time series image data, and background image data is generated based on a dominance determined for each candidate data item is described. Additionally, an example in which the dominance is determined based on the variation of pixel values in the time series image data that fall within a class hold by each candidate data item is described. The present embodiment is the same as Embodiment 1 about the processes until the selection of the candidate data items. The present embodiment differs from Embodiment 1 in the process for determining a background dominance. In the present embodiment, the background dominance is determined using a plurality of image data items captured from a plurality of different view points. In detail, the background dominance is determined based on height information on an object.

Figure 9:
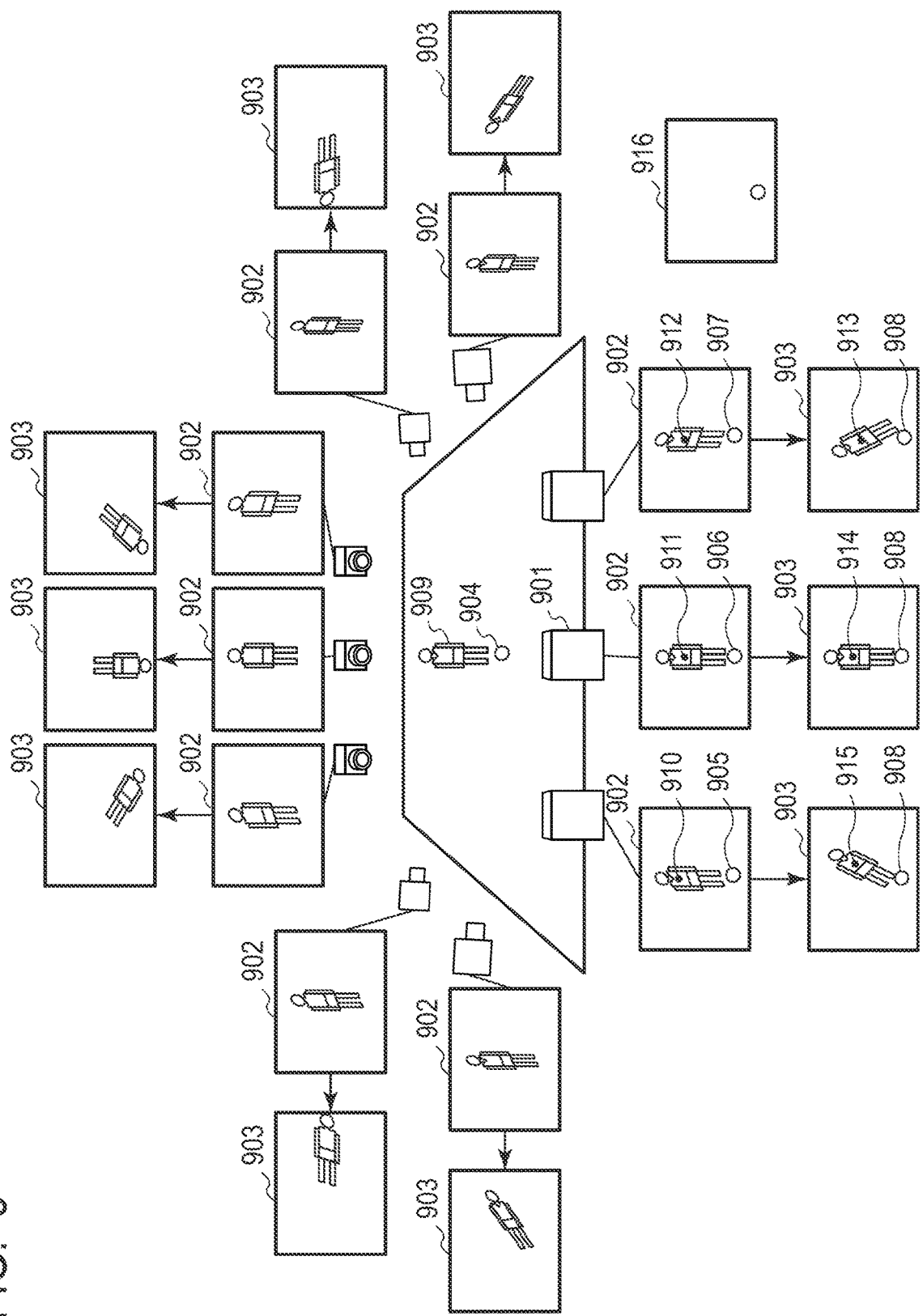
FIG. 9 is a diagram used for describing an outline of generating a background image and extracting a foreground.

FIG. 9 is a diagram used for describing an outline of generating a background image and extracting a foreground in the present embodiment. In Embodiment 2, a plurality of image data items 902 captured from a plurality of different view points is acquired. Hereafter, the images captured from the plurality of different view points will be called multi-view-point image data. The multi-view-point image data acquired here is image data acquired by capturing scenes corresponding to the time series image data on which a process for extracting a foreground is performed. For example, the multi-view-point image data is image data captured at times corresponding to the times at which the time series image data items are captured. The multi-view-point image data 902 is supposed to include an image from the same view point as a view point 901 from which the time series image data is captured. Hereafter, the view point from which the time series image data is captured will be called a target view point.

Next, the multi-view-point image data 902 from the respective view points is converted into image data captured from the target view point 901 with respect to a ground surface. That is, each object in the multi-view-point image data 902 from the respective view points is projected onto the ground surface, and the multi-view-point image data 902 is converted in the form of image data on the projected images of the each object on the ground surface captured from the target view point. In such a manner, converted image data items 903 on a plurality of images into which the multi-view-point image data items are converted are generated.

The converted image data 903 is image data obtained by converting the multi-view-point image data 902 into image data from the target view point 901 using the ground surface as a reference surface. Therefore, in a case where there is an object 904 lying on the ground surface and having no height, pixels corresponding to the object 904 included in the multi-view-point image data 902 (e.g., pixels 905 to 907) are converted into a pixel at an identical pixel position 908 from the target view point, and the converted image data 903 includes the pixel at the identical pixel position 908. In contrast, in a case where there is an object 909 having a height, pixels corresponding to the object 909 included in the multi-view-point image data 902 (e.g., pixels 910 to 912) are converted into pixels at different pixel positions (pixels 913 to 915, etc.) for the respective view points.

In such a manner, in the converted image data items 903, the pixel positions of an object lying on the ground surface are the same between a plurality of items of the converted image data items 903. Therefore, the pixel value of the pixel position in question takes the substantially same pixel value between a plurality of items of the converted image data items 903. In contrast, the pixel positions of an object having a height show variations between a plurality of items of the converted image data items 903, with the result that the pixel value at a specific pixel position will vary. Hence, in the present embodiment, a plurality of generated items of the converted image data items 903 is used to derive a middle value (median value) of the pixel values of each pixel, and an image data item 916 of which pixels are each a derived middle value is generated. The image data item 916 generated using the middle value of each pixel in such a manner represents an image including an object lying on the ground surface (the object 904, etc.) and including no object not lying on the ground.

As described above, the foreground objects refer to predetermined objects included in a captured image. For example, assuming a soccer match or a rugby match, the predetermined objects are persons. Like the persons, the foreground objects are generally objects each having a height from the ground surface. In contrast, the background is a ground formed by grass or soil. Hence, in the present embodiment, the image data item 916 generated from the converted image data items 903 is used for a process for determining a dominance in such a manner that a region lying on the ground and having no height is considered to have a high likelihood of being the background. Specifically, based on a similarity between a pixel value corresponding to the candidate data item described in Embodiment 1 and the image data item 916, a process in which a pixel value having a high similarity is determined to have a high dominance, and a pixel value having a low similarity is determined to have a low dominance is performed. The image data item 916 used for the comparison will be referred to as reference data in the present embodiment.

In Embodiment 1, an aspect in which time series image data is used to generate background image data is described. In the processing of Embodiment 1, an aspect in which a proper item of the background image data is generated even in a case where there is a person temporarily being stationary at a time corresponding to an item of the time series image data is described. However, in a case where there is a foreground object at the same position in image data items at all of the times corresponding to items of the time series image data, the foreground object is identified as the background. As a result, the accuracy in extracting a foreground object in the region in question decreases. In the present embodiment, the multi-view-point image data is acquired and used in a process for determining a background dominance. In addition the dominance is determined based on height information on an object. This enables determination regardless of a motion or a status of a foreground object. As a result, proper background image data including no foreground object is to be generated, which enables a foreground object to be extracted with high accuracy. The time series image data is not limited to the above example, and various kinds of data such as data captured by a monitoring camera are applicable. In addition, it is assumed in the above example that the multi-view-point image data includes images from the target view point but the above example is applicable similarly to a case where the multi-view-point image data includes no images from the target view point.

<Block Diagram>

Figure 10:
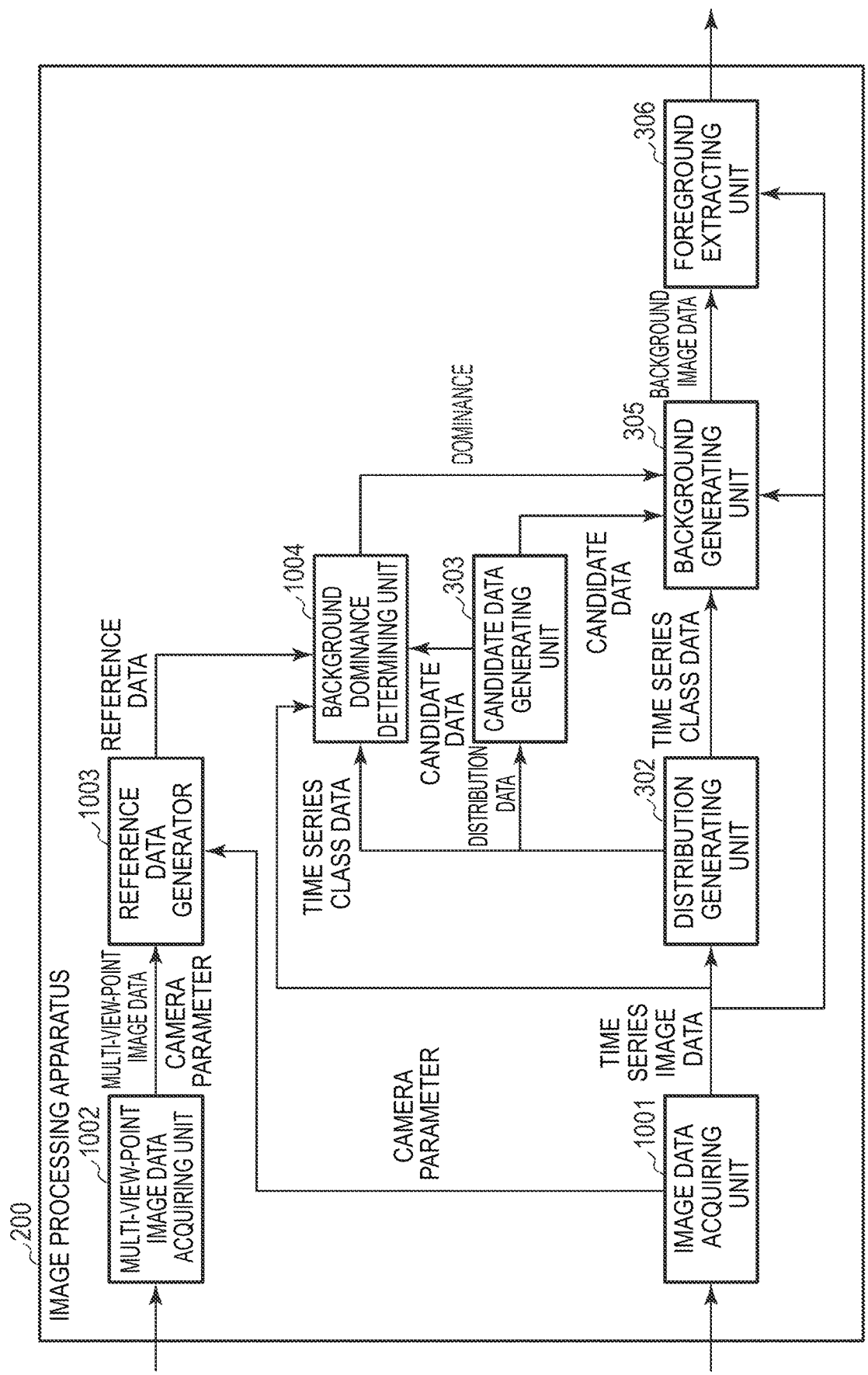
FIG. 10 is a block diagram used for describing a functional configuration of the image processing apparatus.

FIG. 10 is a block diagram illustrating a functional configuration of an image processing apparatus 200 in the present embodiment. The same configuration as the configuration of Embodiment 1 illustrated in FIG. 3 will be denoted by the same reference character, and the description thereof will be omitted. In the present embodiment, a multi-view-point image data acquiring unit 1002 and a reference data generator 1003 are added. In addition, the processes performed by an image data acquiring unit 1001 and a background dominance determining unit 1004 are different from the processes in Embodiment 1.

The image data acquiring unit 1001 is configured, as in Embodiment 1, to acquire time series image data items on which a process for extracting objects in a foreground is performed. The image data acquiring unit 1001 in the present embodiment is configured to further acquire camera parameters of a camera used to capture the time series image data (i.e., camera parameters from the target view point). The camera parameters are parameters such as external parameters representing the position and attitude of the camera, and internal parameters representing a focal distance or an optical center. The parameters of the camera can take any form as long as the parameters are information allowing the calculation of how to project a point in a three-dimensional space onto an image captured by the camera. As the camera parameters, information such as measured values and designed values stored in a memory beforehand can be acquired. The image data acquiring unit 1001 is configured to output the camera parameters to the reference data generator 1003.

The multi-view-point image data acquiring unit 1002 is configured to acquire multi-view-point image data and camera parameters of a camera used to capture the multi-view-point image data. The multi-view-point image data is image data on scenes corresponding to times at which the time series image data is captured. The multi-view-point image data may or may not include image data from a view point of the camera used to capture the time series image data. This is because, even in a case where the image data items from the view point of the camera used to capture the time series image data are not included, the use of the camera parameters enables the conversion into image data items from the target view point, as will be described later. The multi-view-point image data and the camera parameters are output to the reference data generator 1003.

The reference data generator 1003 is configured to generate reference data based on the multi-view-point image data items and the camera parameters for the target view point. The reference data is image data including an object having height information indicating zero (i.e., an object lying on the ground surface). The reference data is output to the background dominance determining unit 1004.

The background dominance determining unit 1004 is configured to determine a background dominance based on distribution data, the time series image data, and the reference data. The details thereof will be described later.

<Flowchart>

Figure 11:
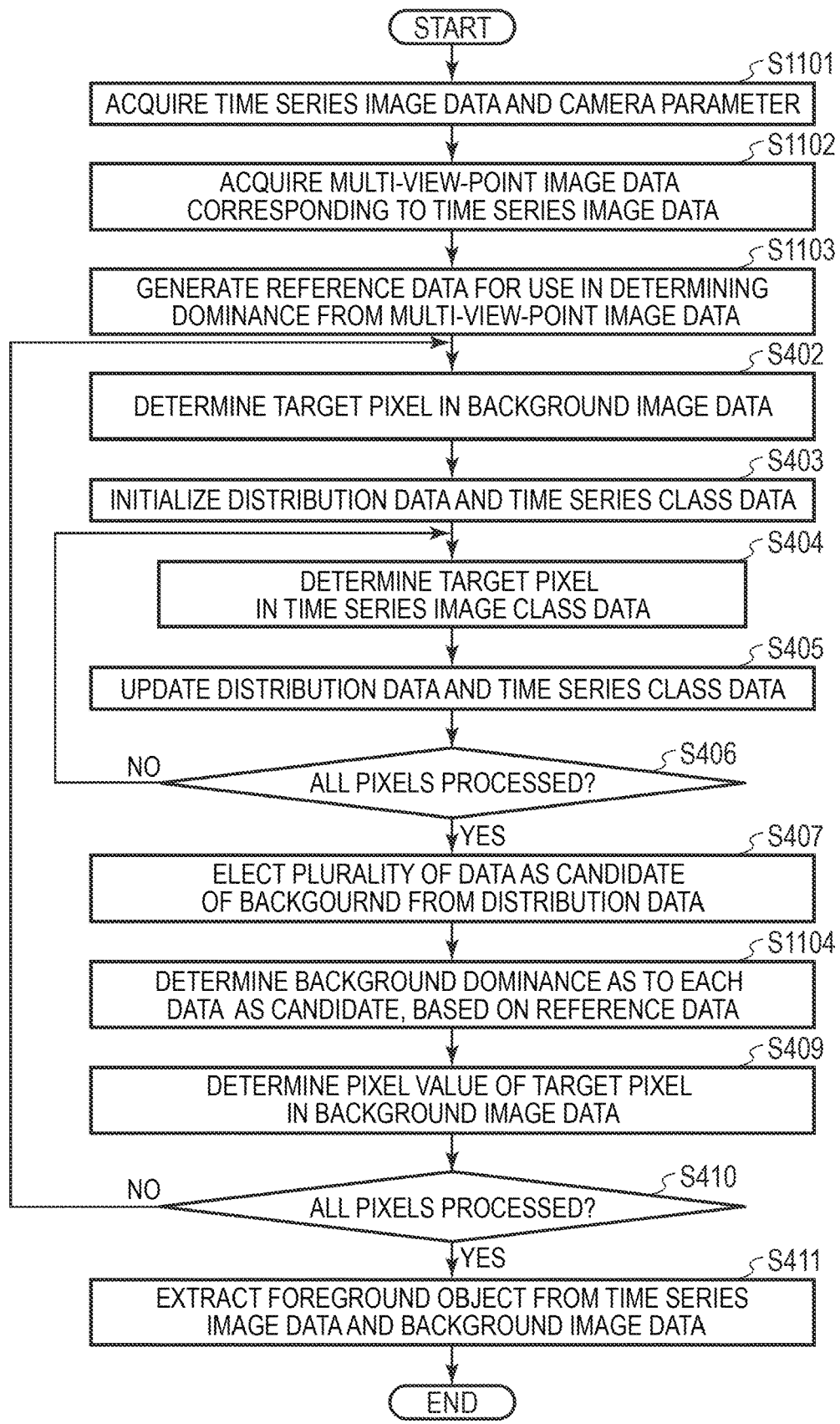
FIG. 11 is a flowchart illustrating a flow of processing.

FIG. 11 is a diagram illustrating an example of a flowchart in the present embodiment. The same processes as the processes of Embodiment 1 illustrated in FIG. 4 will be denoted by the same reference characters, and the description thereof will be omitted.

In step S1101, the image data acquiring unit 1001 acquires the time-series image data as in Embodiment 1. The image data acquiring unit 1001 also acquires the camera parameters of the camera used to capture the time series image data.

In step S1102, the multi-view-point image data acquiring unit 1002 acquires the multi-view-point image data representing a plurality of images acquired at the same time from a plurality of different view points, via the input interface 205 or from the secondary storage apparatus 204. Note that the same time may include an error caused by a transmission delay of a control signal, control properties of cameras, and the like. The multi-view-point image data acquiring unit 1002 also acquires camera parameters corresponding to the images included in the multi-view-point image data. In the present embodiment, one item of multi-view-point image data is acquired for a plurality (all or some) of images in the time series image data. This is however similarly applicable to a case where an item of multi-view-point image data is acquired for every image of the time series image data. The multi-view-point image data acquiring unit 1002 outputs the acquired multi-view-point image data and the camera parameters corresponding to the acquired multi-view-point image data to the reference data generator 1003.

Next, in step S1103, the reference data generator 1003 uses the multi-view-point image data and the camera parameters acquired from the multi-view-point image data acquiring unit 1002 and the camera parameters acquired from the image data acquiring unit 1001 to generate the reference data. The reference data is data serving as a reference to determine the background dominance. A method for generating the reference data will be described below specifically.

The reference data generator 1003 uses the camera parameters acquired from the image data acquiring unit 1001 to convert the multi-view-point image data into image data captured from the target view point. The conversion is made for each image with respect to the ground surface. Here, a method for the conversion will be described with reference to FIG. 12. Hereafter, image data converted into image data captured from the target view point will be called converted image data.

Figure 12:
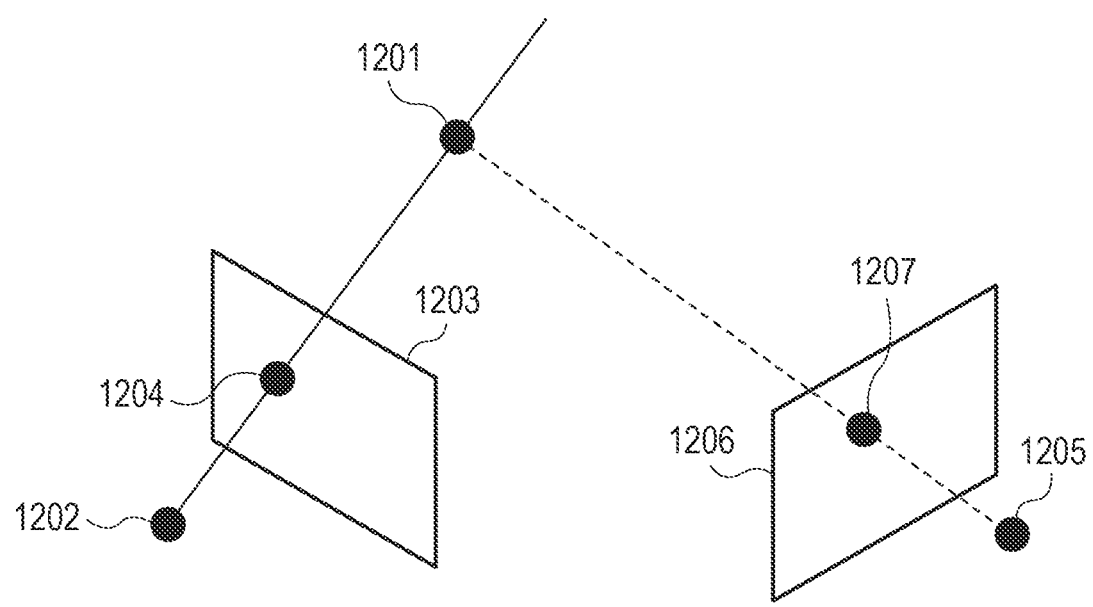
FIG. 12 is a diagram for illustrating a method for converting a view position of an image.

As illustrated in FIG. 12, assume that a point 1201 in a three-dimensional space is projected onto an image surface 1203 of a camera 1202. Here, a point 1204 at which a line connecting the point 1201 and the camera 1202 intersects with the image surface 1203 is a projection image of the point 1201 in the three-dimensional space onto the image surface 1203. Similarly, for a camera 1205 from another view point, a point 1207 at which a line connecting the point 1201 and the camera 1205 intersects with an image surface 1206 is a projection image of the point 1201 onto the image surface 1206. Here, assume that all of the points including the point 1201 in the three-dimensional space that are projected onto the image surface 1203 and the image surface 1206 lie the same plane being the ground surface. In this case, a 3×3 homography matrix $H_{01}$ derived from the camera parameters of the camera 1202 and the camera 1205 is used to covert pixels using the following Formula (5). That is, a pixel (u0, v0) on the image surface 1203 is converted into a pixel (u1, v1) on the image surface 1206. Here, the homography matrix $H_{01}$ is assumed to include a coefficient for conversion with respect to the ground surface.

$$\begin{bmatrix} u_1 \\ v_1 \\ 1 \end{bmatrix} = H_{01} \begin{bmatrix} u_0 \\ v_0 \\ 1 \end{bmatrix} \quad (5)$$

Other pixels on the image surface 1203 can be also converted by the same Formula.

Take the example illustrated in FIG. 12, and assume that a camera used to capture time series image data by the image data acquiring unit 1001 is the camera 1205, and a camera used to capture multi-view-point image data acquired from the multi-view-point image data acquiring unit 1002 is the camera 1202. In addition, the reference data generator 1003 converts image data for each view point. The number of the items of the converted image data is therefore the same as the number of the items of the multi-view-point image data acquired from the multi-view-point image data acquiring unit 1002.

Next, the reference data generator 1003 uses a plurality of items of the converted image data to generate the reference data. Here, the reference data is data holding reference values to be used for determining a background dominance for each pixel in the background image data. In the present embodiment, pixel values of the same channels as the images of the time series image data are used as reference values. The reference data is therefore image data having the same size as the size of the images in the time series image data. The reference data can use a middle value filter to generate a middle value (median value) derived for each pixel from a plurality of images of the converted image data. For example, pixel values of a first channel at a first pixel position in the converted image data are extracted for the number of the plurality of items of the converted image data. The middle value filter is then applied to the extracted pixel values, by which the middle value corresponding to a pixel at the first pixel position is derived. The reference data is data formed of the middle values derived in such a manner from each pixel. However, a method for deriving the pixels forming the reference data, that is, a method for generating the reference data is not limited to the above, and various known methods such as using another filter like an average value filter and clustering processing may be employed. The reference data generator 1003 outputs the generated reference data to the background dominance determining unit 1004.

The same processing as the processing illustrated in FIG. 4 is then performed, and a plurality of candidate data items is generated. For the processing of FIG. 11, an aspect in which the plurality of candidate data items are generated after the reference data is generated is described as an example, but an aspect in which the reference data is generated after the plurality of candidate data items are generated is also allowed.

In step S1104, the background dominance determining unit 1004 determines a background dominance for each of the candidate data items acquired from the candidate data generating unit 303, based on the reference data acquired from the reference data generator 1003. A method for determining the dominance will be described below specifically. In the determination of the dominance, the following are performed on each data item included in the candidate data items.

Figure 13:
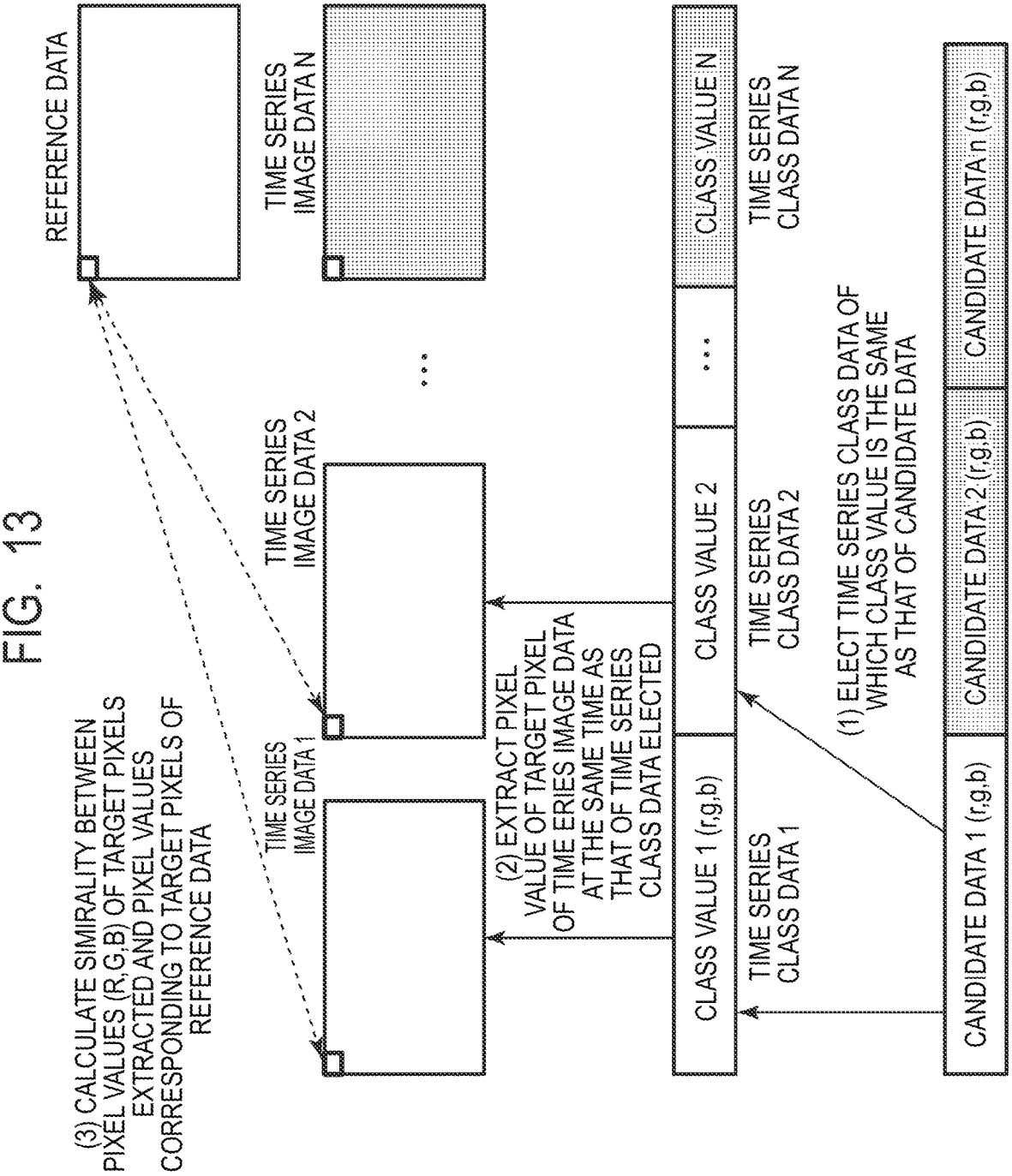
FIG. 13 is a diagram used for describing an outline of processing to determine a dominance.

FIG. 13 is a diagram illustrating an outline of the process determining the dominance in the present embodiment. The process will be described with reference also to FIG. 13. First, the background dominance determining unit 1004 selects all captured time numbers of time series class data items of which sets of three class values of the time series class data items are the same as a set of three class values (class$_r$, class$_g$, class$_b$) in a candidate data item. The number of the selected captured time numbers is equivalent to the frequency of a point of the three class value (class$_r$, class$_g$, class$_b$) in the distribution data.

Next, the background dominance determining unit 1004 extracts all pixel values $Id^j_k(x0, y0)$ of the target pixel in the time series image data corresponding to the selected captured time numbers. Here, j denotes an index for identifying the extracted pixel value, and k denotes an index for identifying a channel of the three RGB channels.

Finally, from the extracted pixel values, the background dominance determining unit 1004 derives the dominance using the following Formula (6).

$$D_i(x_0, y_0) = \frac{1}{\sqrt{\sum_{k=1}^{3} \frac{1}{m} \Sigma_j^m (Id_k^j(x_0, y_0) - Ref_k(x_0, y_0))^2}} \quad (6)$$

An index m denotes the number of extracted pixel values, Di denotes a dominance for the target view point (x0, y0), Ref denotes the reference data, and i denotes an index for identifying each of the candidate data items. The dominance Di derived by Formula (6) increases as a pixel value in the time series image data falling within a class of a candidate data item becomes more similar to a pixel value in the reference data. The dominance used is not limited to this. Any kind of value representing the similarity to the reference data may be used, and values in an alternative color space such as HSV and Lab into which pixel values are converted may be used as the dominance. In addition, as the pixel values to be compared with the reference data, that is, the pixel value Id, a representative value, middle value, average value, or the like of the pixel values falling within a class may be used. After performing the above process on each data item included in the candidate data items, the background dominance determining unit 1004 outputs the determined dominance to the background generating unit 305 for each data item.

<Advantageous Effect>

FIG. 14 is a diagram illustrating a concept of an advantageous effect brought by the processing of the present embodiment. The advantageous effect will be described also with an example of the background image data generated in Embodiment 1 under a specific situation, for reference. In FIG. 14, image data 1401 is time series image data on which the process for extracting the foreground is performed. Background image data 1402 is an example of the background image data generated according to Embodiment 1. In the background image data 1402, a foreground object 1406 is not included, while a foreground object 1407 is taken. The reason of this is that the foreground object 1406 starts to move after being stationary for a certain period of time, while the foreground object 1407 lies at the same position and does not move throughout times at which time series image data is captured. That is, an object that does not move in each image in the time series image data is determined to have a high likelihood of being the background when the dominance is determined. The likelihood of being the background of the foreground object 1407 is therefore mistakenly determined to be high, the result of which is that the foreground object 1407 is included in the background image data 1402. In a case where this background image data 1402 is used to extract a foreground object from time series image data 1401, foreground image data 1403 is acquired. In foreground image data item 1403a nd 1403b, regions of foreground objects other than the object 1407 that move almost all the time are successfully extracted. However, a region of the foreground object 1407 being completely stationary fails to be extracted as the foreground object 1407.

In contrast, the present embodiment includes processing in which the multi-view-point image data captured from a plurality of different view points is used to determine the dominance based on height information on objects. Then, the dominance is used to generate the background image data 1404. The foreground object 1407 is a person and an object having a height. The dominance of the region corresponding to the foreground object 1407 is therefore low, and the foreground object 1407 is not extracted as the background. In a case where this background image data 1404 is used to extract a foreground region from time series image data 1401, foreground image data 1405 is acquired. In the foreground image data 1405, the region of the foreground object 1407 being completely stationary is successfully extracted with high accuracy. As seen from the above, Embodiment 2 enables regions of foreground objects to be extracted with high accuracy regardless of a state such as how an object is moving. In addition, a false recognition of a foreground object that does not move throughout times at which the time series image data is captured, as the background is escaped.

Other Embodiments

Embodiments of the present invention are not limited to the above Embodiments and the present invention can take various embodiments. For example, in the above Embodiments, pixel values are used in the process for extracting a foreground, but values used in the processes are not limited to these values. For example, the process for extracting a foreground may be performed using values in an alternative color space such as HSV and Lab into which the pixel values are converted.

In the above Embodiments, the position and attitude of the camera used to capture the time series image data acquired is unchanged for all of the images included in the time series image data. However, slight fluctuations of the position of the camera are allowed. In this case, a camera used to capture one of a plurality of images in the time series image data is determined as a reference, and the time series image data including images captured by the camera determined as the reference into which the other images are converted may be used.

In the above Embodiments, an item of the background image data is supposed to be created for a plurality of images in the time series image data. However, when the background generating unit generates the background image data, the background image data may be generated for each image data item of the time series image data. In the above Embodiments, an example in which when a pixel value of the background image data is determined based on a candidate data item having the highest dominance, a statistical value such as an average value of pixel values falling within the same class is used is described. In contrast, in a case where the background image data is generated for each image data item of the time series image data, pixel values of items of the time series image data corresponding to times of the generated background image data may be used preferentially. This enables the generation of the background image data appropriate for each image data item of the time series image data, and the accuracy in extracting a foreground is improved.

In the above Embodiments, the process for generating the candidate data and the process for determining the dominance are performed on all of the pixels in the background image data, but the processes may be skipped depending on pixels. For example, in a case where the difference between the maximum frequency in the generated distribution data and the number of images included in the time series image data is substantially zero, or equal to or less than the threshold value determined beforehand, the point of the maximum frequency is determined to be in the background. In this case, the background generating unit may use the point at which the frequency reaches the maximum to determine a pixel value in the background image data.

In the above Embodiments, binary values taking zero or one are used as a representation method for the acquired foreground image data, but the representation method is not limited to this. A representation method in which real numbers taking from zero to one are used, and a pixel value having a higher possibility of being a foreground object has a larger value is allowed.

In the above Embodiments, an aspect in which the distribution data is generated using classes into which pixel values are quantized is described as an example. The degree of the quantization may be determined to any degree. An aspect in which the quantization is not performed is also allowed. That is, an aspect in which the distribution data is generated using pixel values is allowed.

In Embodiment 1, a foreground object that does not move throughout times at which the time series image data is captured can be mistakenly recognized as the background, and Embodiment 2 describes that the possibility of the occurrence of such false recognition decreases. As seen from the above, the background image data can be generated more properly in Embodiment 2 in some cases. However, there is also a case where the background image data can be generated more properly in Embodiment 1. Such a case is, for example, a case where the color of a subject significantly differs between a plurality of image data items of the multi-view-point image data acquired from the multi-view-point image data acquiring unit 1002, or a case where the camera parameters acquired include a large error. The case where the color of a subject significantly differs is caused, for example, by a difference in color between capturing apparatuses used to capture the multi-view-point image data or by the subject itself assuming different colors depending on view directions. In such a case, the reliability of the dominance determined in Embodiment 1 is higher than the reliability of the dominance determined in Embodiment 2.

In addition, the processing described in Embodiment 1 and the processing described in Embodiment 2 may be used in combination. For example, the product ($\alpha \times \beta$) of a dominance $\alpha$ determined by Embodiment 1 (derived by Formula (2)) and a dominance $\beta$ determined by Embodiment 2 (derived by Formula (6)) may be used as the dominance. In addition, a sum ($\alpha + \beta$) may be used rather than the product. The dominance for determining which of Embodiments should be regarded as important can be adjusted by using a weight. For example, assuming that the weight is denotes by λ, the dominance can be adjusted by determining $\alpha \times \beta^{\lambda}$ in a case of using the product, or determining $\alpha + \lambda \times \beta$ in a case of using the sum.

In the above Embodiments, an aspect in which the candidate data is generated based on the distribution of pixel values of each pixel is described as an example, but the generation of the candidate data is not limited to this. An aspect in which the candidate data is generated based on the distribution of values corresponding to a predetermined unit region is also allowed. The predetermined unit region may be a region on a pixel basis as described in the above-described Embodiments or may be a unit region formed of a plurality of pixels. In a case of the unit region formed of a plurality of pixels, values determined by any method using a plurality of pixels (e.g., average value, median value, etc.) may be used as the values corresponding to the predetermined unit region.

According to the present embodiment, a proper background image can be generated using a plurality of images that comes sequentially in time.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-251718, filed Dec. 27, 2017, which is hereby incorporated by reference herein in its entirety.

What is claimed is:

1. An image processing apparatus comprising:
one or more hardware processors; and
one or more memories for storing instructions to be executed by the one or more hardware processors, wherein when the instructions stored in the one or more memories are executed by the one or more hardware processors, the image processing apparatus functions as:
a first acquiring unit configured to acquire a plurality of images obtained by a target image capturing apparatus at different capture timings;
a derivation unit configured to derive an occurrence rate of a pixel value for a target region in each of the plurality of images acquired by the first acquiring unit;
a second acquiring unit configured to acquire a plurality of images obtained by a plurality of image capturing apparatuses in different directions, the plurality of image capturing apparatuses including the target image capturing apparatus;
a specifying unit configured to specify a reference value for the target region based on the plurality of images obtained by the second acquiring unit;
a determining unit configured to determine, based on the occurrence rate derived by the derivation unit and the reference value specified by the specifying unit, a pixel value of a region in a background image, wherein the region in the background image corresponds to the target region image in each of the plurality of images; and
a generating unit configured to generate the background image.

2. The image processing apparatus according to claim 1, wherein the determining unit selects a plurality of candidate data items having the occurrence rate applying to a condition and uses a specified candidate data item of the plurality of selected candidate data items to determine the pixel value of the region in the background image.

3. The image processing apparatus according to claim 2, wherein the condition includes a condition that items of the candidate data are selected for a predetermined number in descendent order from a pixel value of a highest occurrence rate.

4. The image processing apparatus according to claim 2, wherein the condition includes a condition that an item of the candidate data having an occurrence rate exceeding a threshold value is selected.

5. The image processing apparatus according to claim 2,
wherein the plurality of images acquired by the first acquiring unit includes a first image and a second image, and
wherein, in a case where a difference between a pixel value of the target region in the first image in which a value indicated by a first candidate data item appears and the reference value is smaller than a difference between a pixel value of the target region in the second image in which a value indicated by a second candidate data item different from the first candidate data item appears and the reference value, the determining unit determines the first candidate data item as the specified candidate data item.

6. The image processing apparatus according to claim 5, wherein the specifying unit:
converts the plurality of images acquired by the second acquiring unit into a plurality of images captured from a direction of the target image apparatus; and
specifies the reference value based on the converted plurality of images.

7. The image processing apparatus according to claim 6, wherein the reference value includes a median value, a mode value and an average value.

8. The image processing apparatus according to claim 1, wherein the determining unit determines values of regions in the background image and outputs background image, and the image processing apparatus includes an extraction unit configured to extract a foreground object from the plurality of images acquired by the first acquiring unit using the output background image.

9. The image processing apparatus according to claim 1, wherein the target region is a region on a pixel basis.

10. The image processing apparatus according to claim 1, wherein the occurrence rate is an occurrence rate in each class into which pixel values of the pixel are quantized.

11. The image processing apparatus according to claim 10, wherein quantizing the pixel values are performed for each color.

12. The image processing apparatus according to claim 1, wherein the specifying unit specifies the reference value further based on height information.

13. An image processing apparatus comprising:
one or more hardware processors; and
one or more memories for storing instructions to be executed by the one or more hardware processors, wherein when the instructions stored in the one or more memories are executed by the one or more hardware processors, the image processing apparatus functions as:
a first acquiring unit configured to acquire a plurality of images obtained by a target image capturing apparatus at different capture timings;
a derivation unit configured to derive an occurrence rate of a class of pixel values for a target region in each of the plurality of images acquired by the acquiring unit, wherein each class of values corresponds to a range of pixel values;
a selecting unit configured to select a plurality of candidate classes;
a specifying unit configured to specify, for the candidate class, a variation of pixel values of the target region in each of the plurality of images acquired by the first acquiring unit; and
a determining unit configured to determine a pixel value of a region in a background image using a pixel value in a candidate class with a smaller variation of pixel values of the target region than another candidate class.

14. The image processing apparatus according to claim 13, wherein the occurrence rate is an occurrence rate in each class into which pixel values of the pixel are quantized.

15. The image processing apparatus according to claim 13, wherein quantizing the pixel values are performed for each color.

16. An image processing method comprising:
acquiring a plurality of images obtained by a target image capturing apparatus at different capture timings;
deriving an occurrence rate of a pixel value for a target region in each of the plurality of images acquired by the acquiring;
acquiring a plurality of images obtained by a plurality of image capturing apparatuses in different directions, the plurality of image capturing apparatuses including the target image capturing apparatus;
specifying a reference value for the target region based on the plurality of images obtained by acquiring in different directions;
determining, based on the occurrence rate derived by the derivation unit and the reference value specified by the specifying, a pixel value of a region in a background image, wherein the region in the background image corresponds to the target region image in each of the plurality of images; and
generating the background image.

17. A non-transitory computer-readable recording medium storing a readable program for operating a computer to execute an image processing method comprising:
acquiring a plurality of images obtained by a target image capturing apparatus at different capture timings;
deriving an occurrence rate of a pixel value for a target region in each of the plurality of images acquired by the acquiring;
acquiring a plurality of images obtained by a plurality of image capturing apparatuses in different directions, the plurality of image capturing apparatuses including the target image capturing apparatus;
specifying a reference value for the target region based on the plurality of images obtained by acquiring in different directions;
determining, based on the occurrence rate derived by the derivation unit and the reference value specified by the specifying, a pixel value of a region in a background image, wherein the region in the background image corresponds to the target region image in each of the plurality of images; and
generating the background image.

* * * * *